US012039927B2

(12) United States Patent
Hamer et al.

(10) Patent No.: US 12,039,927 B2
(45) Date of Patent: Jul. 16, 2024

(54) PIXEL CIRCUIT FOR CROSSTALK REDUCTION

(71) Applicant: OLEDWorks LLC, Rochester, NY (US)

(72) Inventors: John Hamer, Rochester, NY (US); Charles I. Levey, West Henrietta, NY (US)

(73) Assignee: OLEDWorks LLC, Rochester, NY (US)

( * ) Notice: Subject to any disclaimer, the term of this patent is extended or adjusted under 35 U.S.C. 154(b) by 142 days.

(21) Appl. No.: 17/627,379

(22) PCT Filed: Jul. 26, 2021

(86) PCT No.: PCT/US2021/043137
§ 371 (c)(1),
(2) Date: Jan. 14, 2022

(87) PCT Pub. No.: WO2022/039889
PCT Pub. Date: Feb. 24, 2022

(65) Prior Publication Data
US 2023/0282163 A1 Sep. 7, 2023

Related U.S. Application Data

(60) Provisional application No. 63/067,516, filed on Aug. 19, 2020.

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01);
(Continued)

(58) Field of Classification Search
None
See application file for complete search history.

(56) References Cited

U.S. PATENT DOCUMENTS 4,589,733 A * 5/1986 Yaniv ................ G02F 1/134336 349/50
6,133,692 A 10/2000 Xu et al.
(Continued)

FOREIGN PATENT DOCUMENTS

CN 107134257 B 9/2019

OTHER PUBLICATIONS

English translation, Taiwan office action, with additions (last page, in red) by applicant to show US equivalents.
(Continued)

*Primary Examiner* — Krishna P Neupane

(57) ABSTRACT

An active-matrix display comprising a power source $V_{DD}$; a pixel array of columns and rows, each light-emitting pixel having an individually controlled segmented electrode and an opposite electrode; a driving circuit comprising at least one data line that supplies a data signal for each pixel along a column, wherein the data signal controls the gate of a driving transistor whose source and drain are connected between the power source $V_{DD}$ and the segmented electrode and at least one scan line that supplies a scan signal that controls the gate of a scan transistor that enables the loading of the data signal from the data line to the gate of the driving transistor for each pixel along a row; and a pixel control circuit in electrical contact with the segmented electrode wherein the pixel control circuit prevents light emission by the pixel based on the value of the data signal for that pixel. The pixel control circuit comprises a decision circuit which outputs a signal which controls a bypass transistor which prevents emission whenever the data signal indicates that the
(Continued)

pixel should be non-emitting. This reduces crosstalk, particularly in OLED microdisplays.

13 Claims, 12 Drawing Sheets

(52) U.S. Cl.
CPC ............... *G09G 2300/0861* (2013.01); *G09G 2320/0209* (2013.01); *G09G 2330/02* (2013.01)

(56) References Cited

U.S. PATENT DOCUMENTS

| | | | | |
|---|---|---|---|---|
| 8,035,580 | B2 | 10/2011 | Chung et al. | |
| 9,123,294 | B2 | 9/2015 | Han et al. | |
| 9,324,264 | B2 | 4/2016 | Jeong et al. | |
| 10,665,161 | B2 | 5/2020 | Ota | |
| 11,031,577 | B1 | 6/2021 | Hamer et al. | |
| 2003/0112205 | A1 | 6/2003 | Yamada | |
| 2005/0225232 | A1* | 10/2005 | Boroson | H10K 59/30 313/504 |
| 2005/0259093 | A1 | 11/2005 | Osame et al. | |
| 2010/0091001 | A1* | 4/2010 | Kim | G09G 3/3225 345/76 |
| 2010/0253666 | A1 | 10/2010 | Yamamoto | |
| 2011/0175882 | A1* | 7/2011 | Stryakhilev | G09G 3/3233 345/211 |
| 2013/0249883 | A1 | 9/2013 | Hwang | |
| 2014/0176520 | A1 | 6/2014 | Hwang et al. | |
| 2016/0240142 | A1* | 8/2016 | Jeong | G09G 3/3233 |
| 2018/0180951 | A1 | 6/2018 | Toyotaka | |
| 2019/0096336 | A1* | 3/2019 | Lee | H10K 59/12 |
| 2020/0066815 | A1 | 2/2020 | Choi et al. | |

OTHER PUBLICATIONS

Lin et al, “UHD AMOLED Driving Scheme of Compensation Pixel and Gate Driver Circuits Achieving High-Speed Operation”, J. Elec. Devices Soc., 6, 26 (2017).
Kimura et al, “New pixel driving circuit using self-discharging compensation method for high resolution OLED micro displays on a silicon backplane”, J. Soc. Info. Display, 25(3), 167 (2017).
Kwak et al, “Organic Light-Emitting Diode-on-Silicon Pixel Circuit Using the Source Follower Structure with Active Load for Microdisplays”, Japanese Journal of Applied Physics, 50, 03CC05 (2011).
Vogel et al, “OLED microdisplays in near-to-eye applications: challenges and solutions”, Proc. SPIE 10335, Digital Optical Technologies, 1022502 (2017).

* cited by examiner

FIG. 10A
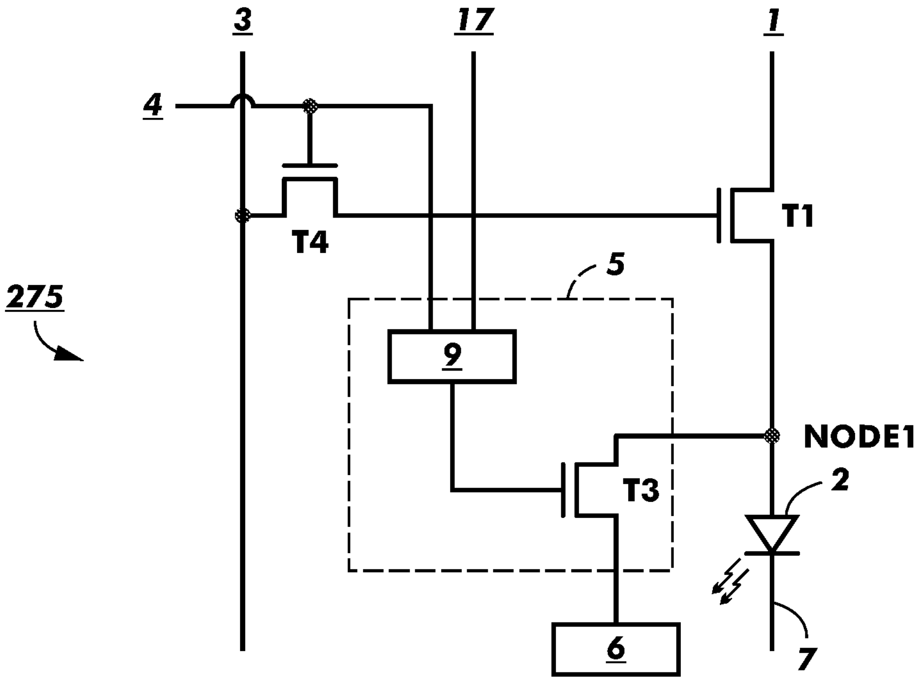
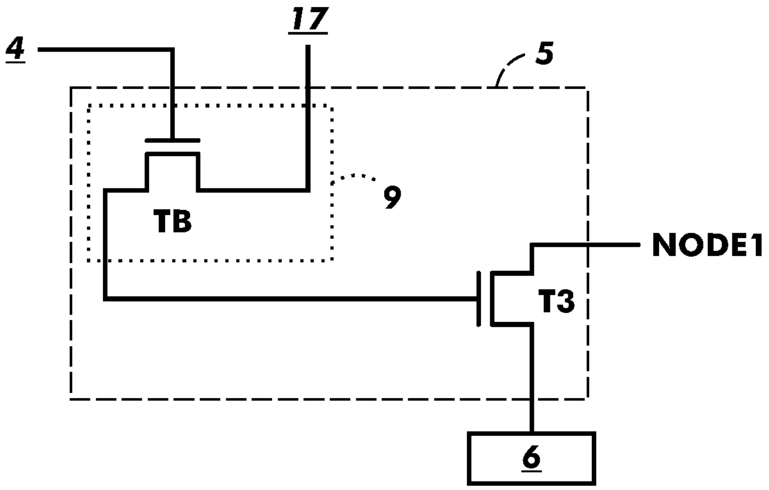
FIG. 10B

PIXEL CIRCUIT FOR CROSSTALK REDUCTION

CROSS REFERENCE TO RELATED APPLICATIONS

This application claims the benefit of U.S. Provisional Application No. 63/067,516, filed Aug. 19, 2020.

Reference is made to PCT application PCT/US21/15031, entitled "STACKED OLED MICRODISPLAY WITH LOW-VOLTAGE SILICON BACKPLANE" and filed Jan. 26, 2021 as well as PCT Application PCT/US21/15038, entitled "OLED DISPLAY WITH PROTECTION CIRCUIT" and filed Jan. 26, 2021. Reference is also made to non-provisional U.S. application Ser. No. 16/695,191, entitled "MULTIMODAL MICROCAVITY OLED WITH MULTIPLE BLUE-EMITTING LAYERS", filed Nov. 26, 2019, now U.S. Pat. No. 11,031,577.

TECHNICAL FIELD

The subject invention relates to a pixel circuit, and more particularly to a pixel circuit for crosstalk reduction.

BACKGROUND

Crosstalk in displays is where the emitted luminance provided by one pixel is unintentionally affected by another pixel. This is undesirable because the pixel affected no longer provides the exact luminance according to the image signal and so, the quality of the image can be degraded. Depending on the amount and nature of the crosstalk, important factors such as color reproduction, contrast (difference between maximum and minimum luminance), gray-scale, resolution and "ghosting" in displays can all be negatively impacted.

Any and all types of displays that involve individually controlled pixels to generate an image can be affected by crosstalk to some degree. For example, crosstalk can affect image quality in LED, Quantum Dot and OLED devices. Crosstalk issues tend to be independent of display type. For example, Electroluminescent displays (ELD) displays, back-lit Liquid Crystal displays (LCD), Light-emitting diode displays (LED) including MicroLED displays, Organic Light-Emitting Diode displays (OLED), Plasma displays (PDP), Stereoscopic Displays and Quantum Dot displays (QLED) may all suffer from some degree of image degradation from crosstalk. Crosstalk issues also tend to be independent of the type of the light-generating engine in the display; for example, LED, OLED, Quantum Dots. Etc. based displays can all be affected. Typically, the pixels in flat panel displays (i.e., not CRTs) are controlled either by some type of matrix addressing such as active-matrix or passive-matrix designs. Both of these designs can be subject to crosstalk issues.

In some cases, crosstalk may be due to the control circuitry of the display itself such as parasitic capacitance or residual currents. However, this tends not to be a large problem for most designs.

Not all displays suffer from the same degree from crosstalk and some types may be more prone to crosstalk issues. In particular, microdisplays (typically active-matrix devices), where the individual pixels are small and located relatively close together, are susceptible to crosstalk problems. Likewise, OLED displays, which depend on charge migration through vertically stacked organic layers, can also be susceptible to crosstalk problems due to lateral migration.

A discussion of crosstalk effects in these formats can be found in Diethelm et al, "Quantitative analysis of pixel crosstalk in AMOLED displays", Journal of Information Display, 19(2), 61 (2018); Pennick et al, "Modelling cross-talk through common semiconductor layers in AMOLED displays", J. Soc. Info. Display, 26(9), 546 (2018); and Braga et al, "Modeling Electrical and Optical Cross-Talk between Adjacent Pixels in Organic Light-Emitting Diode Displays", Soc. Info. Display Digest; 50(S1), Paper 3.3 (2019).

Typically, a microdisplay is less than two inches diagonal (approx. 5 cm) down to an ultra-small display size of less than 0.25" diagonal. In most cases, the resolution of the microdisplay is high and the pixel pitch is usually 5 to 15 microns. First introduced commercially in the late 1990s, they are commonly used for rear-projection TVs, Head Mounted Displays (HMDs), head-up displays (HUDs), electronic view finders (EVFs), near-eye displays, augmented reality devices, virtual reality devices, smart watches and other wearable devices, and digital cameras. Microdisplays can be made from a range of light-generating technologies, including in particular, MicroLED (Light Emitting Diode) and Organic Light Emitting Diode (OLED).

Currently, microLED microdisplays are based on a standard Gallium Nitride (GaN) wafer, adopted from standard LEDs. This approach has the potential to provide high luminance display devices without lifetime issues at a relatively low price. In general, the standard GaN wafer is patterned into arrays of micro-LEDs. The microLED display is then produced by an integration of the micro-LED array and transistors. However, this approach has several manufacturing concerns including monolithic formation of the micro-LEDs over the transistors, pixel spacing, color generation, and spatial uniformity due to variations of color and luminance between the individual microLEDs.

OLED technology shares many of the attractive features of microLED technology for microdisplays. It is self-emissive, has excellent image quality, is efficient and has an ultra-high color rendition and wide color space. Moreover, formation of an OLED over the transistors is much easier and lower cost than formation of a microLED because OLED layers can be vacuum deposited or directly coated on the transistor backplane. On the other hand, OLEDs can have limited luminance and limited lifetime.

Thus, OLED microdisplays are very attractive from the standpoint of cost and manufacturability. Such devices would typically use active-matrix TFT circuitry either on a non-conducting substrate such as glass or a silicon backplane to control the individual pixel. Typically, these would be manufactured using an OLED formulation with an individually controlled electrode controlled by the circuitry in the backplane. In terms of the OLED, they could be formulated so that each pixel is formulated differently (i.e., each individual pixel emits red (R), green (G) or blue (B) light) or the OLED is formulated in common across all pixels and emits white light so that when used in conjunction with a color filter array (CFA), individual R, G or B pixels are formed. Of these, OLED formulations that are common across all pixels are preferable because they are cheaper and easier to manufacture.

Crosstalk can be caused by both optical and chemical/electrical mechanisms. Some optical processes that can increase the amount of crosstalk include light-scattering and wave-guiding within the device. Optical cross-over can occur in any type of device that internally generates light. Specific to OLEDs with common layers across all pixels, some chemical/electrical processes that can increase crosstalk include lateral carrier migration from an active-pixel area to a neighboring non-active pixel area within the same layer. This migration of charge can create voltage and current in the neighboring pixels and leads to undesired and unintentional emission from that pixel.

It is desirable that the amount of crosstalk between pixels from all sources be 10% or less of the total amount of emission of that pixel, preferable 3% or less, and most preferable 1% or less.

It is believed that there are multiple mechanisms that can result in crosstalk. Short-range modes (0.2-0.7 μm) appear to be a combination of lateral charge carrier and optical mechanisms. Medium-range modes (3-7 μm) interactions appear to be primarily due to lateral charge carrier migration but can be due partially to optical mechanisms. Long-range modes (50-200 μm) interactions appear to be primarily due to light-scatter from an active pixel area to a non-active area. It is also believed that there is an even longer-range optical contribution to crosstalk based on wave-guiding according to the pixel pitch.

Some useful methods to minimize the problem of crosstalk due to optical processes within a display device include:

The use of pixel definition layers, scattering layers or other types of optical barriers or structures between pixels that helps to restrict light travel to within the pixel and minimize light travel across different pixels. For example, see U.S. Ser. No. 10/483,310B2, US20170038597A1; US20190056618A1; CN110416247A and CN110429196A In devices with a color filter array (CFA), optimized color filters to reduce light wave guiding between the air/glass interface and the reflective anode, including the use of optical filtering layers specifically designed to absorb light traveling at high angles from the substrate normal direction. For example, see US20160065914.

Light-scattering reduced by reduction in scattering sites. In particular, the amount of small particle debris on or near the bottom electrode should be minimized. Scattering can also occur from roughness in the cathode or anode which can depend on the composition and process used for deposition (for example, see Shen et al, "Efficient Upper-Excited State Fluorescence in an Organic Hyperbolic Metamaterial", Nano Lett., 18 (3), 1693-1698 (2018)).

The overall electrode surfaces should be as flat and smooth as possible over both the active pixel areas and between the pixels. In particular, it is known that protrusions, humps or other structures that form a PDL (pixel defining layer) between the pixels and extend above the surface of the anode within the pixel area, can be useful for scattering light back into the pixel area and prevent it from entering a neighboring (unlit) pixel. However, this approach is not as effective when thicker OLED layers that overlay the structures are present. Light trapped within the thicker layer is more likely to be internally reflected within the layer so that it can travel over the structure to the other side. If the electrodes and OLED layers are uniformly flat, light that is wave guiding within the layers of the display is more likely continue uninterrupted until it is absorbed or reaches the edge of the display.

The use of interlayer absorbers for wave-guided light.

Light absorption by the dielectric of the backplane.

Some useful methods to minimize the problem of crosstalk due to carrier migration in the OLED device include:

The use of pixel definition layers, trenches, separators, dividers or other types of physical barriers or structures between pixels that helps to restrict carrier migration within the originating pixel and minimize any carrier migration to a different pixel. For example, see US20210151714, US2020388658, US2020/0066815, US20190280062A1, US20190006443A, US20180180951A1, CN110148619A and CN110634922A.

The use of a ground plane beneath the segmented anodes of an OLED. For example, see U.S. Ser. No. 10/128,317.

Lateral charge carrier migration reduced by changing layer thicknesses and composition (to increase "sheet resistance") in layers with high carrier mobility (for example; HILs, HTLs, CGLs, ETLs and EILs). In particular, charge carriers (either holes or electrons) are generated within an active area and can move laterally move across the gap between the lit area and the unlit area. This problem appears to occur primarily in layers next to or near one of the electrodes. In some cases, CGL (charge generation layers) can also contribute since they have very high carrier mobility. It is believed that the common HIL and HTL layers over the anode may be the largest contributor to the problem. It appears that once the holes are generated in the energized area of the HIL on one anode pad, they can migrate to a neighboring anode pad and the resulting voltage due to the holes can exceed the threshold voltage $V_{th}$ of the OLED and so the (nominally unlit) pixel emits light without regard to the image signal for that pixel. In addition, the holes can enter the conductive anode pad as electrons and flow laterally through the anode with very little lateral resistance. At the far side of the anode pad, the current can pass back into the HIL (as holes) for the jump to the next unlit anode pad. Thus, the problem of carrier migration may not just be limited to a shorter distance between adjacent anode pads, but could have a longer distance component as well. For this reason, careful attention should be paid to the thickness and composition of both electrodes and in particular, the anode. Thinner organic layers with less carrier mobility help to minimize these undesirable carrier migration processes. For example, see US20170317308A1.

Reduce lateral charge carrier migration by modifying the layer to have higher resistance in areas between the electrode segments. For example, see US20201772651.

Material choice for the organic layers with high carrier mobility. In particular, materials may be selected to minimize their contribution to crosstalk. The type and level of p-dopant (for example, F4-TCNQ, F6-TCNNQ or HAT-CN) added to the HIL may be important in this regard as well as the choice of HTM (for example, aromatic amine compounds such as NPB or spiro-TTB) in the HIL or HTL. P-dopant only or non-doped HIL may also be effective. In some cases, a non-doped HIL and a p-doped HTL can be used. Inorganic HIL materials such as $MoO_3$ (which may be mixed with organic materials) may also have advantages. For example, see US20170330918A1; US20170301864A1; and US20170301861A1.

In OLEDs, design of the HIL and anode to create a barrier for charges from the HIL to enter the anode is advantageous.

It is also possible to reduce crosstalk by compensation of the driving signal. The original image signal may be adjusted to compensate for differences in light emission by each pixel due to crosstalk so that the desired emission is achieved. However, this requires that the amount of crosstalk present in each pixel in each image be predictable and the image signal be recalculated for each image frame. This greatly increases demand for computation as well as overall computation time. This increases the cost of the device as well as affects response time. In such an approach, there may be parts of the color volume in the areas of high color saturation that cannot be reproduced by displays relying solely on this approach.

Generally speaking, crosstalk is most visible and of highest concern for those pixels that are supposed to have minimum or no ("black') light emission, or relatively low emission. This is because the additional unintentional light, even if small, arising from crosstalk becomes a very large percentage of overall emission compared to the low or no emission intentionally coming from the pixel. The addition of a small amount of light arising from crosstalk to a pixel with high emission should be less noticeable.

Crosstalk is also more problematic in situations where there are large differences between the emission of a pixel and pixels that are adjacent or spatially close. This could be in terms of pixels where the luminance is low or "black" (non-emitting or minimum emittance) being close to pixels where the luminance is high or at its maximum level. Crosstalk issues can also apply to situations where single color-emitting pixels (for example, a red pixel) are close to pixels emitting a different color (for example, a green pixel) even though the luminance values for both are similar. Moreover, if an unlit pixel of a different color from the color of a neighboring lit pixel but emits that different color because of crosstalk, then highly saturated primary and secondary colors cannot be realized by the display.

There are two common situations where pixels with low or no emission are located near high emission pixels. The first is according to the image. It should be noted that most images are correlated; that is, pixels that are close together will most often have a similar amount of emission and so the degree of crosstalk will be relatively low within the region. For example, there will be little crosstalk in the middle of a large black patch or the middle of a large white patch. Only at edges or boundaries within the image will there be large differences in emission between pixels. Thus, correlated regions of emission may not be uniform and be different in the center than along the boundaries due to crosstalk. The same problem occurs with correlated single-color pixels where color mixing will be more pronounced along edges and boundaries.

The second situation is a display where the emission is generated by scanning through the individual pixels as opposed to all pixels lighting simultaneously. Examples of such devices include passive-matrix and active-matrix displays. In such displays, the pixels are arranged in a matrix of columns and rows. In active-matrix displays, a data signal corresponding to the required luminance according to the image for each pixel along a particular row is created. Then, a scan line allows the data signal to pass to the pixels along that particular row, and the pixels produces the required luminance as per the data signal. Then, the data signals for the next row are generated and the scan line for the next row is activated so the pixels in the next row can create luminance. This row-by-row scanning is repeated to create the entire image and occurs within the threshold of vision to detect. However, crosstalk allows some pixels to produce light when they are supposed to be in an "off" state at that time.

Thus, it would be desirable to prevent emission from pixels due to crosstalk in pixelated display devices by removing or dissipating any voltage or current being supplied to the light-generating portion of a pixel whenever the pixel is supposed to be in an "OFF" or minimum emission state. While such a solution could be applied to any kind of display, it would be particularly suitable when applied to an OLED microdisplay, and even more desirably, where the OLED is a multimodal (white) microcavity OLED used in combination with a CFA. This is because the common layers in the multimodal microcavity OLED allow carrier migration from one "ON" pixel to another neighboring pixel, which might be "OFF", thus creating enough voltage in the neighboring "OFF" pixel to cause emission, because the layers in a microcavity OLED are necessarily thick (in order to create the microcavity) which promotes lateral carrier migration, and for multimodal OLED microdisplays with 3 or more stacks of light-emitting units, because of high voltages required to drive these multistack OLEDs. This also applies to OLED microdisplays with individually deposited R, G and B emissive materials within the designated pixels, but where all pixels share at least one common OLED layer.

US20100091001A1 and U.S. Pat. No. 8,035,580 both describe a pixel circuit for digital driving of an OLED. Pixel emission due to current leakage through a driving transistor is prevented using a bypass transistor that connects the anode of an OLED to voltage source (which can be set to a potential less than that at the cathode of the OLED) when the pixel is in an "OFF" state. The same data signal is applied to the gates of both the bypass transistor and the driving transistor when a scan line is activated for that row of pixels.

CN107134257B describes a pixel circuit for preventing pixel emission due to carrier migration within a charge generating layer (CGL) using a transistor that connects the anode of an OLED to a low voltage source $V_{SENSE}$. The gate of the connecting transistor is controlled by a scan line separate from the scan line used to control the driving transistor.

U.S. Ser. No. 10/665,161B2 describes a pixel circuit for preventing pixel emission due to current leakage through a driving transistor where there is a discharge section that can cause a flow of the drive current to bypass the light emitting element. The discharge section contains a transistor whose gate is controlled by a scan signal separate from the scan signal that controls the driving transistor.

U.S. Pat. No. 9,324,264B2 describes a pixel circuit for preventing pixel emission using a bypass unit, with a bypass transistor, that connects the anode of an OLED to $V_{VAR}$ (which can be set to a potential less that that at the cathode of the OLED) when the pixel is in an "OFF" state. In various embodiments, the gate of the bypass transistor is controlled by a scan line or a separate DC voltage supply.

U.S. Pat. No. 9,123,294B2 describes a pixel circuit for compensating the threshold voltage of the driving TFT. As part of the circuit, there is a transistor that allows the driving current to bypass the OLED so that there is no emission from the pixel. The gate of this transistor is controlled by the same scan line used to control the gate of the driving transistor or a different scan line.

US20030112205A1 describes a pixel circuit that can reduce the occurrence of residual image phenomenon using a discharging circuit which discharges electric charge accumulated across the pixel. The discharging circuit contains a bypass transistor who gate is controlled by the scan line.

US202000066815 discloses a pixel circuit with a leakage current sink to prevent crosstalk between pixels that contains a leakage current control transistor located between the connection between a serially connected drive and emission transistors and a ground. The gate of the leakage current control transistor is controlled by $V_{BIAS}$, which is the same for all pixels in the display, and not a data signal.

US20180180951 describes a display device with a pixel circuit that has a transistor whose source is connected to a node between a driving transistor and the anode of a light-emitting device and whose drain is connected to a potential supply line, which can be a ground. The gate of this transistor is controlled by a scan line.

US20100253666 describes a pixel circuit with a discharge transistor connected between a node located between a driving transistor and the pixel whose gate is controlled by a scan signal.

Lin et al, "UHD AMOLED Driving Scheme of Compensation Pixel and Gate Driver Circuits Achieving High-Speed Operation", J. Elec. Devices Soc., 6, 26 (2017) describes a pixel circuit for compensating variations in Vth. As part of the circuit, there is a transistor in electrical contact with the OLED and $V_{SS}$ that allows the driving current to bypass the OLED. The gate of this bypass transistor is controlled by a scan line different from the scan line used to control the scan transistor that controls the gate of the drive transistor.

Kimura et al, "New pixel driving circuit using self-discharging compensation method for high resolution OLED micro displays on a silicon backplane", J. Soc. Info. Display, 25(3), 167 (2017) disclose a pixel circuit for luminance uniformity that includes a bypass circuit between the anode of the OLED and VSS to improve contrast. This bypass circuit has a transistor whose gate is controlled by a scan line different from the scan line used to control the scan transistor that controls the gate of the drive transistor.

Kwak et al, "Organic Light-Emitting Diode-on-Silicon Pixel Circuit Using the Source Follower Structure with Active Load for Microdisplays", Japanese Journal of Applied Physics, 50, 03CC05 (2011) describe a pixel circuit for improving uniformity that includes a bypass circuit between a node located between an emission transistor and the anode of the OLED and a ground. The gate of this bypass transistor is connected to the node so that Vg=Vs in order to limit the drain voltage at the emission transistor. The purpose of this is so as not to exceed the maximum allowed $V_{ds}$ of the transistors.

Vogel et al, "OLED microdisplays in near-to-eye applications: challenges and solutions", Proc. SPIE 10335, Digital Optical Technologies, 1022502 (2017) describe the problems of making OLED microdisplays. It notes that "The challenge at high luminance is to supply and modulate the forward voltage at dynamic range levels of 2V up to 7 V (or even more, depending on OLED stack architecture) toward each OLED pixel; this requires integrated driving transistors able to withstand voltage swing of 5 V or more. That's a high-voltage for advanced mixed-signal CMOS processes . . . ." This reference also notes "Due to opaque CMOS backplanes with feasible voltage sweeps of about 5V, only top-emitting single and double units can be integrated.". It describes OLED configurations that require a higher operating voltage, which results in the need for transistors rated to operate at voltages greater than 5V, and the impact such higher voltage transistors would have on aperture ratio and pixel size.

SUMMARY

Some important features of the invention include, but are not limited to:

An active-matrix display comprising a power source $V_{DD}$ (1); a pixel array of columns and rows, each light-emitting pixel (2) having an individually controlled segmented electrode (109) and an opposite electrode (125); a driving circuit comprising at least one data line (3) that supplies a data signal ($V_{DATA}$) for each pixel (2) along a column, wherein the data signal ($V_{DATA}$) controls the gate of a driving transistor (T1) whose source and drain are connected between the power source $V_{DD}$ (1) and the segmented electrode (109) and at least one scan line (4) that supplies a scan signal ($V_{SCAN}$) that controls the gate of a scan transistor (T4) that enables the loading of the data signal ($V_{DATA}$) from the data line (3) to the gate of the driving transistor (T1) for each pixel (2) along a row; and a pixel control circuit (5) in electrical contact with the segmented electrode (109) wherein the pixel control circuit (5) prevents light emission by the pixel (2) based on the value of the data signal ($V_{DATA}$) for that pixel (2).

The pixel control circuit (5) can be attached to a node (NODE1) located along the electrical line between the driving transistor (T1) and the segmented electrode (109). The pixel control circuit (5) prevents light emission by having a bypass transistor (T3) that allows electrical connection between the segmented electrode (109) and a sink (6), which drains the voltage and/or current to a level below that needed for light emission, whenever the data signal ($V_{DATA}$) indicates that the pixel (2) should be non-emitting or have emission below a threshold. The pixel control circuit (5) is disabled when the value of the data signal ($V_{DATA}$) for that pixel (2) indicates emission above a threshold.

The pixel control circuit (5) may comprise: a decision subunit (9) that compares the data signal voltage $V_{DATA}$ to a reference voltage $V_{REF}$ and based on that comparison, provides an output voltage $V_{OUTPUT}$; and a latch subunit (10) that receives the output voltage $V_{OUTPUT}$ from the decision subunit (9) and controls the bypass transistor (T3) so that either the electrical connection between the segmented electrode (109) and the sink (6) is allowed or disallowed based on $V_{OUTPUT}$.

Additionally, whenever the scan signal ($V_{SCAN}$) indicates that the scan transistor (T4) should prevent the loading of the data signal ($V_{DATA}$) to the gate of the driving transistor (T1) and $V_{OUTPUT}$ was set to disable the bypass transistor (T3), then the bypass transistor (T3) allows electrical connection between the segmented electrode (109) and a sink (6), which drains the voltage and/or current to a level below that needed for light emission.

The pixel control circuit (5) may comprise a decision subunit (9) that compares the data signal voltage $V_{DATA}$ to a reference voltage $V_{REF}$ and based on that comparison, provides an output voltage $V_{OUTPUT}$; a transistor (TB) whose gate is controlled by a scan signal $V_{SCAN}$ and is connected in series between the decision subunit (9) and the gate of the bypass transistor (T3); so that whenever $V_{SCAN}$ is such that the transistor (TB) is enabled so that $V_{OUTPUT}$ is applied to the gate of the bypass transistor (T3), electrical connection between the segmented electrode (109) and a sink (6) is allowed or disallowed based on the value of $V_{OUTPUT}$.

Any of the above pixel control circuits where $V_{REF}$ and the voltage of the power source $V_{DD}$ (1) are the same.

The above displays can be an OLED microdisplay, particularly where the light-emitting pixels (2) are formed using a multimodal microcavity OLED with a color filter array (129A, 129B, 129C), may additionally have three or more stacks of light-emitting units (113, 117, 121), or may have a threshold voltage $V_{th}$ of 5V or greater.

Any of the above displays where there is a switching transistor (T6) connected in series between the driving transistor (T1) and the segmented electrode (109) so that the driving transistor (T1) and switching transistor (T6) are in series between the power source (1) and the segmented electrode (109). The driving transistor (T1) and switching transistors (T6) can be both p-channel transistors and the bypass transistor (T3) may be a n-channel transistor.

The above displays have reduced crosstalk effects.

BRIEF DESCRIPTION OF THE DRAWINGS

FIG. 10A shows an inventive pixel circuit 275.

FIG. 10B shows the details of one embodiment of a decision circuit 9 of 275

DETAILED DESCRIPTION

Figure 1:
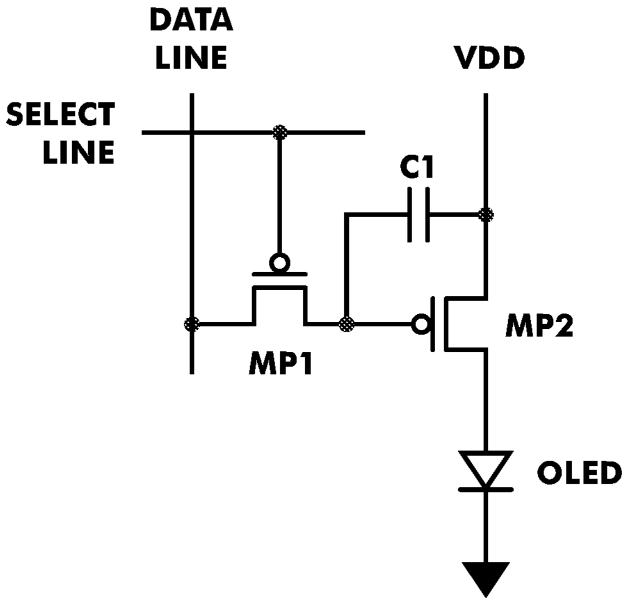
FIG. 1 (PRIOR ART)
FIG. 1 shows a simple prior art control circuit for an OLED.

It should be noted that any of the described features may be combined in any order or extent without limitation as desired, except when incompatible.

For the purposes of this disclosure, the terms "over" or "above" mean that the structure involved is located above another structure, that is, on the side opposite from the substrate. "Top", "uppermost" or "upper" refers to a side or surface further from the substrate while "bottom", "bottommost" or "bottom" refers to the side or surface closest to the substrate. Unless otherwise noted, "over" should be interpreted as either that the two structures may be in direct contact or there may be intermediate layers between them. By "layer", it should be understood that a layer has two sides or surfaces (an uppermost and bottommost) and that multiple layers may be present and is not limited to a single layer.

For light-emitting units or layers, R indicates a layer that primarily emits red light (>600 nm, desirably in the range of 620-660 nm), G indicates that a layer primarily emits green light (500-600 nm, desirably in the range of 540-565 nm) and B indicates a layer that primarily emits blue light (<500 nm, desirably in the range of 440-485 nm). It is important to note that R, G and B layers can produce some degree of light outside the indicated range, but the amount is always less than the primary color. Y (yellow) indicates that a layer that emits significant amounts of both R and G light with a much lesser amount of B light. "LEL" means light-emitting layer. Unless otherwise noted, wavelengths are expressed in vacuum values and not in-situ values.

The threshold voltage ($V_{th}$) of the OLED stack can be estimated by linear extrapolation of the I-V curve after significant light emission begins back to the voltage axis. Because this method is not exact because I-V response curves for OLEDs may not be completely linear over their response ranges, values calculated in this manner are not exact. A general range is +/−10%.

Active-matrix displays are generally understood to have an array of individual controlled pixels arranged in a two-dimensional array of orthogonal columns and rows. However, it is also understood that "columns" and "rows" are subjective terms and do not imply any particular orientation but rather two groupings of individual pixels which only overlap at a single pixel. It is conventional in the active-matrix art that "columns" are generally portrayed as being aligned in a vertical direction in the array and "rows" are generally portrayed as being aligned in a horizontal direction in the array. Likewise, there are common electrical connections for all pixels along a "column" which are conventionally referred to as "data lines" and which are portrayed as being in a vertical direction as well common electrical connections for all pixels along a "row" which are conventionally referred to "scan" or "select" lines and which are portrayed as being in a horizontal direction. However, these conventional terms may or may not reflect the actual physical locations of the pixels. It is generally understood that "data signals" sent to a pixel control the amount of luminance required by that pixel, while "scan or select signals" control the timing of when the "data signal" is sent and received by the pixel.

In active-matrix displays, each pixel must have at least one individually controlled electrode that is separate and distinct from the individually controlled electrode of other pixels in order to operate. In other words, the individually controlled electrode portion of each pixel is 'segmented' or divided up into individually controlled portions as compared to being common or continuous across all pixels. Typically, electrical connection of the pixel circuit to the light-emitting element is made through the segmented electrode. Note that in the context of this description, a "pixel" acts as a single, uniform and minimum unit and is not further subdivided. For example, a color pixel (that is, a discrete point in a color image) that can produce white light can be composed of three separated but spatially correlated "pixels", each emitting one of R, G or B light which together act as subpixels for the color pixel. Further note that a pixel can consist of a single light-emitting element or multiple commonly controlled light-emitting elements that all act together in unison.

In the following, the terms "OFF" and "ON" are used generally in reference to a specific element or feature and may have different requirements depending the kind of element. For a pixel, "OFF" means no (or a minimum amount below a threshold of) light being emitted from the pixel and "ON" means at least some light above a minimum level (above a threshold) is being emitted. "ON" may mean full emission or partial emission; that is, some level of emission above the minimum, which is desirably zero. For the light-generating engine in the pixel (i.e., OLED or LED), "OFF" means no measurable luminance above a minimum luminance and "ON" means there is measurable luminance above the minimum. For NMOS/PMOS circuit elements such as p-channel and n-channel transistors, "OFF" means $I_{ds}$ is essentially zero except for any leakage current; "ON" means that $I_{ds}$ is non-zero and at least some current passes through the transistor. This applies to all transistors including scan, drive, emission and bypass transistors without regard to the type of transistor. In such elements, "OFF" or "ON" is controlled by the voltage applied to the gate of the device. In terms of a Data or Scan signal, "OFF" means a data value that is applied to the pixel circuit, particularly the gate of a transistor, such that any/all of the below described "OFF" conditions occur; likewise, "ON" means a data value that is applied to the pixel circuit, particularly the gate of a transistor, such that any/all of the below described "ON" conditions occur.

A pixel that is "OFF" should have no more than 1% of the maximum emission that can be produced, and more preferably 0.01%. Ideally, an "OFF" pixel should have no emission at all. An "OFF" pixel can also be called a "dark" or "black" pixel, which are equivalent terms.

The minimum amount of emission can be defined or set according to a threshold emission value which will depend on the type and characteristics of the particular display. Typically, the threshold can be 1% or less of the maximum emission that the pixel is capable of emitting, desirably less than 0.1% of the maximum emission and most desirably zero emission.

The data or image signal in displays is sent by the control circuitry to each subpixel to control the level of its emission. It is common that these image signals are not continuous but quantized into some number of levels between the signal that generates the upper or maximum level of emission and the signal that generates no or the least amount of emission. These levels are called Code Values or CV (among other designations). A common system used in displays is where a CV=0 indicates no emission and a CV=255 indicates maximum emission so that there are 254 discrete intermediate levels between the two extremes. For example, in an 8-bit, sRGB-like color encoding, 1% intensity corresponds to about CV 26, while 0.01% corresponds to less than one CV, although it should be noted that using more than 8 bits or using a different nonlinear encoding would mean 1% or 0.01% would correspond to different CVs. Ideally, in CV terms, the threshold for emission to apply the PCC circuit should be <30 CV, desirably <5 CV and most desirably 0 CV or the equivalent if not 8-bit, sRGB-like color encoding.

The data or image signal in displays is sent by the control circuitry to each subpixel to control the level of its emission. It is common that these image signals are not continuous but quantized into some number of levels between the signal that generates the upper or maximum level of emission and the signal that generates no or the least amount of emission. These levels are called Code Values or CV (among other designations). A common system used in displays is where a CV=0 indicates no emission and a CV=255 indicates maximum emission so that there are 254 discrete intermediate levels between the two extremes. Thus, in a system using CV values between 0 and 255 to control the luminance of each pixel unit, a threshold for activating the PCC for that pixel unit can be a CV=3 or less and most desirably, a CV of zero.

The purpose of the above active-matrix pixel circuit is to turn "ON" the light-emitting element (to cause emission at some level) or "OFF" the light-emitting element (no or minimum emission) based on the signal from the data line. The signal from the scan line only controls the timing of when the data signal is applied to the pixel. No emission from the pixel will occur whenever the value of the data signal meets any one of the following criteria:

- where the value of the data signal is insufficient to cause the pixel circuit to allow light emission of that pixel;
- where the voltage at the segmented electrode is less than or equal to the voltage at the opposite electrode;
- where the voltage at the segmented electrode minus the voltage at the opposite electrode is less than the threshold voltage of the light-emitting element;
- where the current provided by the pixel circuit according to the data signal at the segmented electrode is insufficient to cause light emission of the pixel. The current at the segmented electrode can be less than 1 microamp per $cm^2$ of anode pad.

Accordingly, for the purposes of this invention, a pixel is considered "OFF" whenever the data signal has a value intended by the display controller so that any of the above criteria will be met, and "ON" whenever the data signal has a value intended so that none of the above criteria will be met. Note that even if a pixel is "OFF" according to the value of the data signal, there still can be some emission due to crosstalk or other factors such as current leakage through the transistors.

The pixel circuits of the invention are desirably part of a silicon backplane. Silicon backplanes are derived from a silicon wafer (also called a slice or substrate). They are a thin slice of semiconductor, such as a crystalline silicon (c-Si), used for the fabrication of integrated circuits. The wafer serves as the substrate for microelectronic devices built in and upon the wafer. It undergoes many microfabrication processes, such as doping, ion implantation, etching, thin-film deposition of various materials, and photolithographic patterning. Finally, the individual microcircuits are separated by wafer dicing and packaged as an integrated circuit. Wafers are grown from crystal having a regular crystal structure, with silicon having a diamond cubic structure with a lattice spacing. When cut into wafers, the surface is aligned in one of several relative directions known as crystal orientations. Silicon wafers are generally not 100% pure silicon, but are instead formed with an initial impurity doping concentration of boron, phosphorus, arsenic, or antimony which is added to the melt and defines the wafer as either bulk n-type or p-type. For background, see Chapter 7 in "Flat Panel Display Manufacturing", Souk, L., Ed., 2018. It is desirable that the silicon backplane be a single-crystal Si wafer.

In order to provide control circuitry for the operation of the stacked OLED, thin-film transistors (TFTs) along with other components such as capacitors, resistors, connecting wires, and the like are provided on the surface of the silicon wafer. For example, see T. Arai, "High Performance TFT Technologies for the AM-OLED Display manufacturing", Thesis, Nara Institute of Science and Technology, 2016; M. K. Han, Proc. of ASID '06, 8-12 October, New Delhi; U.S. Pat. No. 9,066,379; and U.S. Ser. No. 10/163,998. It should be understood that the TFTs may or may not incorporate the silicon wafer as part of the TFT structure or may be prepared from separate materials deposited on the surface.

TFTs can be made using a wide variety of semiconductor materials. The characteristics of a silicon-based TFT depend on the silicon's crystalline state; that is, the semiconductor layer can be either amorphous silicon, microcrystalline silicon, or it can be annealed into polysilicon (including low-temperature polysilicon (LTPS) and laser annealing).

The manufacture of silicon backplanes with suitable control circuitry is a very well known, understood and predictable art. However, because of the cost and complexity of the manufacturing process and equipment, it is often not practical to build facilities to manufacture a particular backplane. Instead, a foundry model was been widely adopted in the industry where the functional characteristics of microelectronic devices have become more standardized. This standardization allowed design to be split from manufacture. A design that obeyed the appropriate design rules could be more easily and cheaply manufactured by different companies that had compatible manufacturing methods. For this reason, the control circuitry on silicon backplanes is generally limited to the use of standard components selected from a range of options provided by the manufacturer of the backplane. For example, a manufacturer of silicon backplanes may provide the option of incorporating various designs of transistors such as 1.8V, 2.5V, 3.3V, 5V, 8V and 12V into a customer's design, but would not be able to provide (without great expense) transistors that are not included in the offered designs.

For the purposes of this application, "Low-Voltage" (LV) is defined as those analog microelectronic components that are sized and designed to safely and reliably operate at 5V or less. "Medium-Voltage" (MV) microelectronic devices are generally considered to be in the range of 9-12V while "High-Voltage" (HV) microelectronic devices are generally considered to be in the range of 18-25V. It should be noted that these voltage ratings are set by the manufacturers and the manufacturers do not recommend exceeding the set maximum voltage for each transistor.

Active-matrix displays, which generate light (luminescence) upon electrical activation, that have been deposited or integrated onto a thin-film transistor (TFT) array located on a silicon chip, where the TFT array functions as a series of switches to control the current flowing to each individual pixel. Typically, this continuous current flow is controlled by at least two TFTs at each pixel (to trigger the luminescence), with one TFT to start and stop the charging of a storage capacitor and the second to provide a voltage source at the level needed to create a constant current to the pixel.

This is illustrated in FIG. 1, which represents the simplest form of prior art active-matrix pixel design. In active-matrix displays, there is a single pixel circuit that controls each individual pixel and is located within the display area of the backplane. The simplest active-matrix pixel circuit which has pixel memory uses two transistors and one capacitor. The current-driving transistor MP2 is conventionally connected from the supply voltage $V_{DD}$ to a segmented electrode of the light-emitting element. One TFT (MP2) drives the current for the element and another TFT MP1 acts as a switch to sample and hold a voltage onto the storage capacitor C1 as shown. There is a data line ($V_{DATA}$) that controls the current ($I_{VDD}$ or $I_{SD}$) passing through the driving transistor MP2. There is a select line that controls scan (select) transistor MP1 and thus, the charging of the capacitor C1. In general, the transistors have intrinsic capacitance, so additional capacitance may not be needed depending on the intrinsic capacitance of the transistors and the leakage currents through the transistors. In the figures after FIG. 1, any capacitors present may have been omitted from the drawings for clarity.

Figure 2:
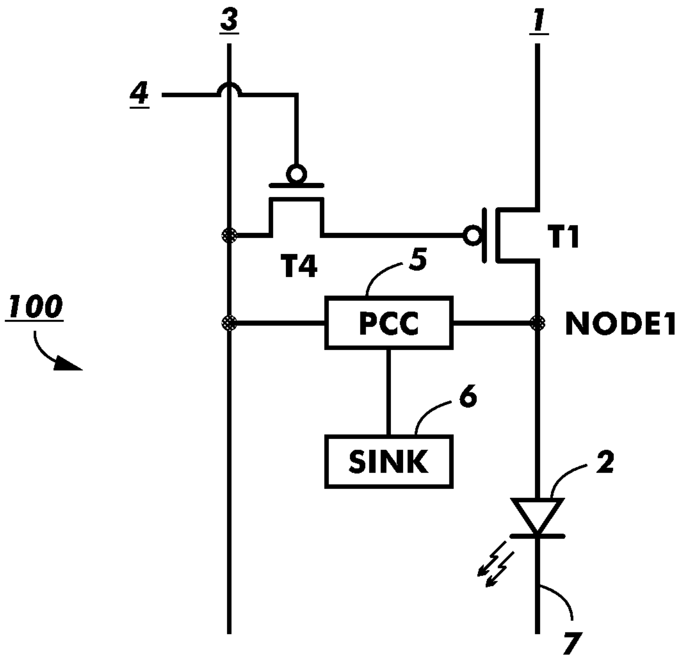
FIG. 2 shows a basic inventive pixel circuit 100 with a basic pixel control circuit.

FIG. 2 shows a basic pixel circuit 100 for controlling the amount of crosstalk in a display by ensuring that the voltage and/or current at the segmented electrode of the pixel is always maintained below the level needed for emission whenever the data signal for that pixel is such that the pixel is not supposed to emit any light. As noted, various sources of crosstalk can cause a sufficient amount of voltage and/or current to occur at the segmented electrode of pixel to enable some degree of emission, without regard to whether that pixel has received a data signal sufficient to cause emission or not. In particular, the voltage and/or current generated by crosstalk sufficient to cause emission in a pixel that is supposed to be non-emitting because of the data signal is problematic.

In basic pixel circuit 100 of an individual pixel, there is a power source 1 connected to the source of a driving transistor T1 and the segmented electrode of a light-emitting element 2 which is connected to the drain of T1. The gate of T1 is connected to a data line 3 through the source and drain of a scan (select) transistor T4. The gate of T4 is connected to a scan line 4. The data line 3 supplies a data signal $V_{DATA}$, which is typically a voltage. The scan line 4 supplies a scan signal $V_{SCAN}$, which is typically a voltage. There is a pixel control circuit (PCC) 5 attached to NODE1 located between the drain of T1 and the segmented electrode of the light-emitting element 2. PCC 5 is also connected to the data line 3 as well as a sink 6. The opposite electrode of the light-emitting element 2 is connected to a second power source 7. In this example, T1 and T4 are p-channel transistors.

NODE1 is an electrical connection located along the electrical line between the driving transistor and the pixel (2). Desirably, there are no other electrical components connected in series between NODE1 and the light-emitting element (2). Desirably, there is at least one driving transistor in series between NODE1 and the power source (1).

In terms of operation, the power source 1 will supply sufficient power to the segmented electrode of the light-emitting element 2 whenever the data signal, delivered through the data line 3 and select transistor T4 to the gate of T1, enables current flow through T1 and so, the pixel will emit according to the magnitude of the data signal. The select transistor T4 is controlled by the scan line 4 in order to select an individual row of pixels. In pixel rows not selected, T4 prevents the voltage from the data line 3 flowing to the gate of driving transistor T1 and so, T1 does not enable current flow from the power source 1 to the segmented electrode of the light-emitting element 2 and so, the pixel should not change its emissions until the scan line reconnects the pixel to the data line.

PCC 5 helps to prevent increased emission in pixels from crosstalk by maintaining the voltage and/or current at the segmented electrode 2 below that required to cause light emission whenever the data signal is such that it will not enable current flow through T1 (i.e., no emission from the pixel is desired). PCC 5 uses the data signal as input. Whenever the data signal is such that it will not cause the pixel to emit or only have very low emission, PCC 5 electrically connects the segmented electrode 2 to sink 6, which maintains the voltage and/or current at a level below that necessary to cause the pixel to emit. However, whenever the data signal is such that it will cause the pixel to emit, then PCC 5 does not connect the segmented electrode 2 to sink 6. In this way, the pixel is prevented from having emission whenever the data signal is such that the pixel is supposed to be non-emitting, even if there is enough voltage and/or current at that pixel for emission due to crosstalk. When the pixel is supposed to be emitting above some minimum amount, PCC 5 is not involved in the driving of the pixel. It should be noted that whether PCC 5 connects the segmented electrode 2 to the sink 6 is determined by the value of the data signal received from the data line 3 and is independent of whether the row is selected through the scan line 4.

PCC 5 is an integral part of the pixel circuit 100. By integral part of the pixel circuit, it is meant that the PCC 5 is located locally in the backplane together with the driving transistor and other components of the pixel circuit underneath the pixel and within the active display area. PCC 5 only controls one pixel at a time according to the data signal for that pixel over the frame period. It does not control other pixels along the same row that are typically selected by a scan or select line.

PCC 5 is not part of the device circuitry (a display controller) that determines and controls the data signal and the timing of the scan/select signal; such controller circuitry is typically located outside the active display area. Generally speaking, the display (image) controller converts a plurality of image signals into a plurality of image data signals and transmits the same to the data driver. The controller receives a vertical synchronization signal Vsync, a horizontal synchronizing signal Hsync, and a clock signal, generates control signals for controlling the scan driver, the emission control driver, and the data driver, and transmits them to the appropriate line. Further, the controller generates the power control signal for controlling the power supply and transmits the same to the power supply. While the internal operations of the controller may use the data signal and scan signal to turn "ON" or "OFF" a particular pixel, this is different from the invention where the determination to enable the bypassing of an "OFF" pixel is made in the local individual pixel circuit and based on the data signal.

Sink 6 is a pixel circuit component that controls the voltage at the segmented electrode of the pixel. It can contain an electrical connection to a power source $V_{BIAS}$ which maintains the voltage below $V_{th}$ of the pixel to prevent emission. The power supply wiring for $V_{BIAS}$ is preferred to be common to all pixels to make the backplane simpler, more compact, and lower cost (less mask levels). Sink 6 can also be connected to a ground or have an electrical connection to the opposite electrode 125 of the pixel (typically, $V_{SS}$).

Figure 3:
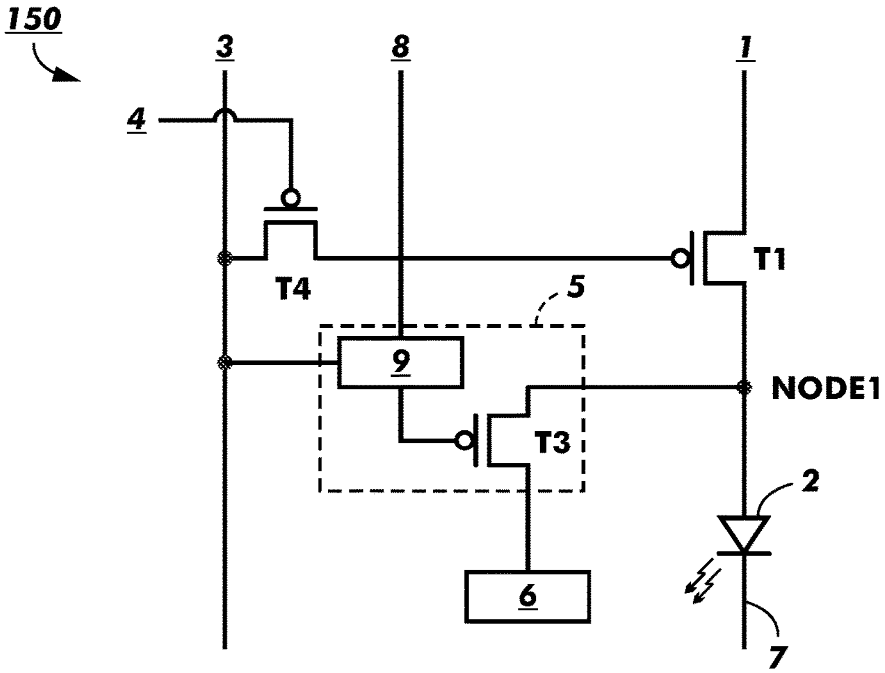
FIG. 3 shows an inventive pixel circuit 150 with a more detailed pixel control circuit.

FIG. 3 shows a basic pixel circuit 150, which is similar to circuit 100 in FIG. 2. In particular PCC 5 (within the dashed box) has a bypass transistor T3 connected between NODE1 and the sink 6. The gate of bypass transistor T3 is controlled via a decision circuit 9 which is connected to the data line 3. When the decision circuit 9 determines that the value of the data signal is sufficient to cause the pixel to emit light above some predetermined amount, the voltage at the gate of T3 is set so that T3 will not pass current from NODE1 to sink 6. However, when the decision circuit 9 determines that the data signal is such that the pixel should not emit light (or less than some predetermined amount of emission), then the voltage at the gate of T3 is set so that NODE1 and sink 6 are in electrical contact and so, any voltage and/or current present at the segmented electrode (from example, due to electrical crosstalk from any source) will be removed and so, the pixel will have no emission. In this embodiment, decision circuit 9 makes the judgement of how to set the voltage at the gate of T3 using only the data signal from data line 3 as input. Generally speaking, the bypass transistor T3 is controlled so that it is fully "ON" (allowing electrical connection) or "OFF" (no electrical connection) by controlling the gate voltage appropriately.

As noted, the decision circuit 9 makes a determination, based on the data signal for that pixel, of whether the pixel is supposed to be "ON" or "OFF" and then activates T3 appropriately to allow or disallow potential to pass from the segmented electrode 2 to the sink 6. This control of T3 can be based only on the data signal with no other input. This determination, which is based only on the data signal, can be made in any number of ways or methods.

For example, consider an example of a display with pixel circuits where the data signal, expressed as the voltage $V_{DATA}$, is zero when the emission from the pixel should be "OFF" and high (non-zero) whenever the emission from the pixel should be "ON". In this case, $V_{DATA}$ can be used directly and without modification as input for the latch circuit 10 as shown in 200 in FIG. 7. The output WATCH of the latch circuit 10 will then the same as $V_{DATA}$ (zero or high) although fixed at that value through the remainder of the frame until reset. If the drive transistor and the scan transistor (and the shutter transistor T6 if present; see FIG. 11) are p-channel transistors and T3 is a n-channel transistor, then if the output voltage $V_{LATCH}$ is zero to the gate of T3, T3 will be "OFF", but if the $V_{LATCH}$ is high, then T3 will be "ON". However, in some driving methods, $V_{DATA}$ may not be sufficient to cause T3 to be fully "ON". This is undesirable since it will not allow whatever current is present to bypass the pixel when it is "OFF". In this case, as part of the decision circuit 9, a non-zero $V_{DATA}$ may activate a switch that connects the gate of T3 with another power source (for example, voltage $V_{DD}$ of power source 1) with a sufficient level to turn T3 "ON", or $V_{DATA}$ may be transformed to a higher voltage by including a voltage multiplier circuit. If necessary, a voltage limiter circuit (typically including a Zener diode) may additionally be present.

FIG. 3 also shows the optional presence of an electrical connection between the decision circuit 9 and a reference source 8. In one embodiment, the determination of whether the data signal is sufficient to cause emission or not can be made by comparing the data signal to the reference signal. For example, if the data signal from the data line 3 is a voltage signal $V_{DATA}$ and the reference signal from reference line 8 is a voltage $V_{REF}$, the difference between $V_{DATA}$ and $V_{REF}$ can be used to set the voltage at the gate of bypass transistor T3 to allow or disallow electrical connection between NODE1 and sink 6. In some cases, the power source 1 can be used as the reference signal. For example, power source 1 is maintained at a voltage $V_{DD}$, then $V_{DD}$ can be used as the reference signal to compare to $V_{DATA}$ ($V_{REF}=V_{DD}$). The reference signal may be higher or lower in value than the data signal. The reference signal 8 is common to all pixels.

In general, the decision circuit 9 may comprise a decision circuit that has the function of telling if an input voltage is above or below a given threshold. A decision circuit can also compare two voltages and provides an output to indicate which is larger. Decision circuits (sometimes referred to as a comparator or comparator circuit) are often used, for example, to check whether an input has reached some predetermined value. Comparator circuits for use in OLEDs are well-known. For example, see U.S. Pat. No. 9,786,209B2, US20060082528A1, US 20190088205, U.S. Pat. No. 7,595,596B2, In et al, "P-8: A Novel Feedback-Type AMOLEDs Driving Method for Large-Size Panel Applications", Society for Information Display, 36(1), 252 (2005) and Neha et al, "Design and Analysis of Comparators using 180 nm CMOS Technology", International J. of Elec. And Comm. Tech., 7(2), 122 (2016).

Figure 4:
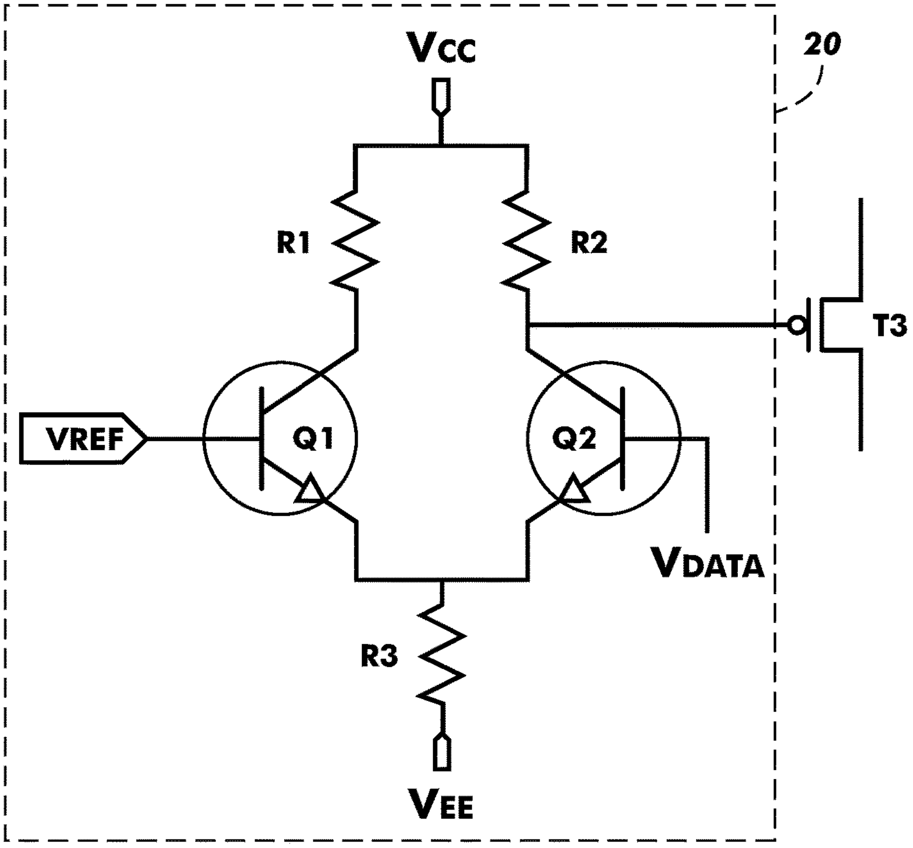
FIG. 4 shows one embodiment of a decision circuit portion of the pixel control circuit that uses BJT components.

One example of a suitable decision circuit 9 that requires a reference signal is shown in FIG. 4 where comparator circuit 20 (which is part of the decision circuit) uses bipolar junction transistors (BJT). In FIG. 4, the simple comparator 20 has two operating states with either BJT Q1 "ON" and BJT Q2 "OFF" or Q1 "OFF" and Q2 "ON". The threshold "ON"/"OFF" voltages for Q1 and Q2 are the $V_{be}$ (difference in V between the base and the emitter) "ON" voltages for those transistors. For Q1 "ON" and Q2 "OFF", $V_{REF}$ is greater than $V_{DATA}$ by an amount such that the $V_{be}$ of Q1 is greater than the $V_{be}$ of Q2. The voltage at the connection of resistor R3 ($V_{R3}$) and the emitters of Q1 and Q2 becomes equal to $V_{REF}-V_{be}$(Q1). This is sufficient such that $V_{DATA}-V_{R3}$ is not sufficient to keep Q2 "ON". If $V_{DATA}$ is greater than $V_{REF}$, then Q2 turns "ON" and Q1 turns "OFF" with the same reasoning. The "ON"/"OFF" state of Q2 controls the "ON"/"OFF" state of T3 by the connection of the output of Q2 to the gate of T3. T3 is "ON"/"OFF" when Q2 is "ON"/"OFF". $V_{CC}$ and $V_{EE}$ provide external operating voltage sources necessary for the circuit components to function. $V_{CC}$ should be more positive than $V_{EE}$, which may be connected to a ground.

Figure 5:
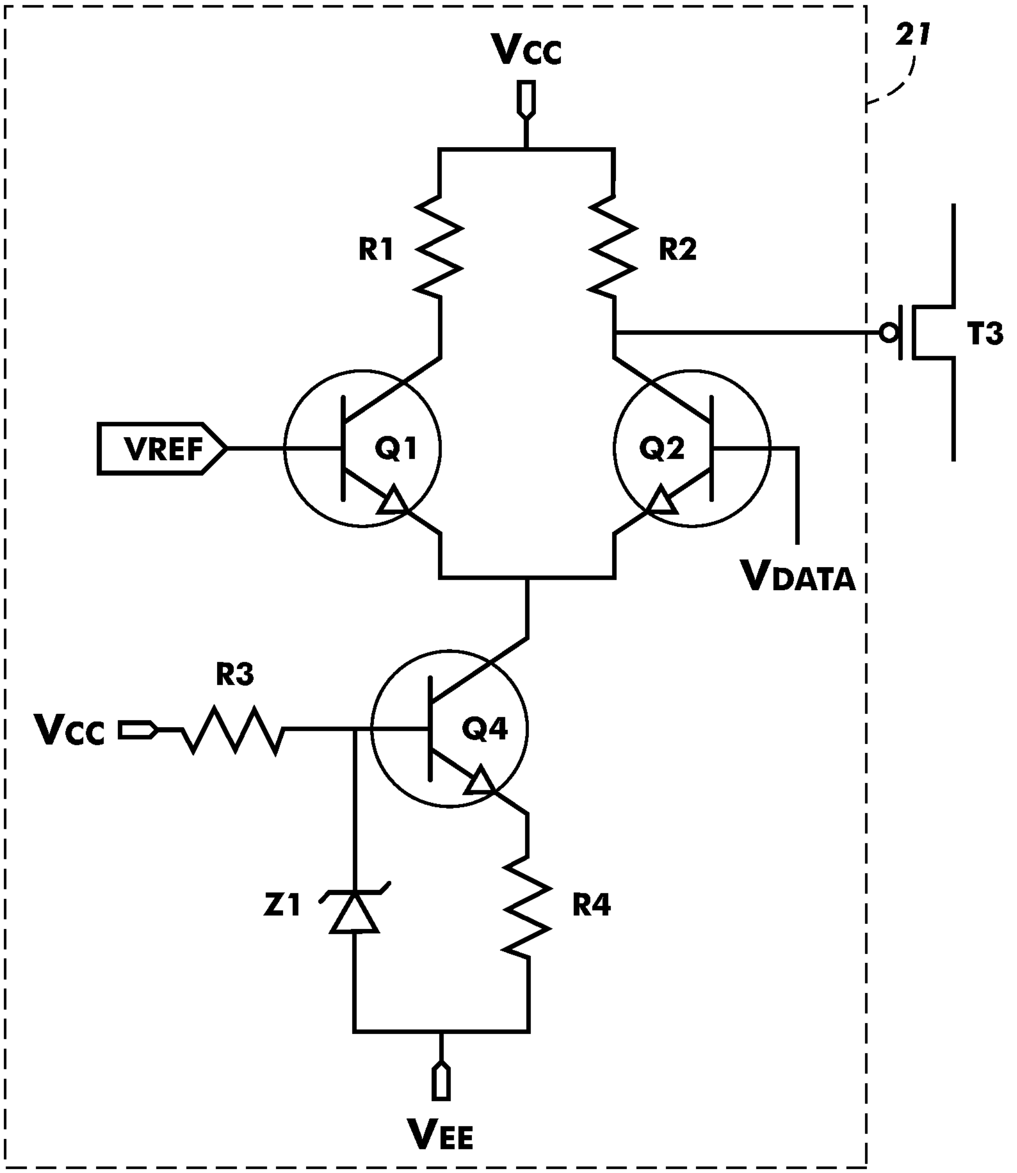
FIG. 5 shows another embodiment of a decision circuit portion of the pixel control circuit that uses BJT components.

FIG. 5 shows another comparator circuit 21 that operates in the same manner as FIG. 4 except R3 is replaced by the R3, R4, Z1 (a Zener diode), Q4 circuit. This circuit provides a constant Q4 current ($V_{Z1}-V_{be}$Q4−Vee)/R4 which determines how much greater $V_{REF}$ compared to $V_{DATA}$ must before switching of Q1 and Q2 occurs. It should provide a more precise output than the comparator circuit of FIG. 4.

Figure 6:
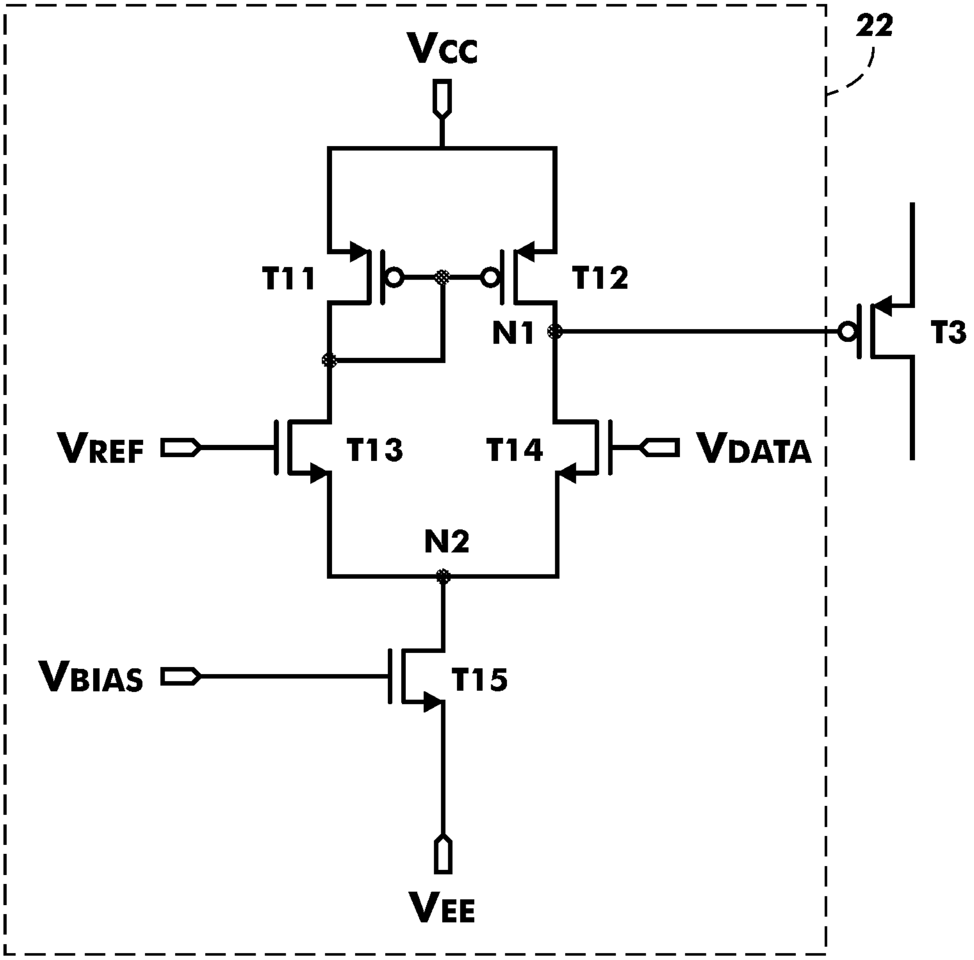
FIG. 6 shows another embodiment of a decision circuit portion of the pixel control circuit that uses CMOS components.

FIG. 6 shows an example of another comparator circuit 22 which is based using CMOS components. By function, T11 and T12 replace R1 and R2. T13 and T14 replace Q1 and Q2. T15 replaces R3, R4, Q4 and Z1. T15 sets a bias current set by the gate to source voltage ($V_{gs}$) of T15 which is equal to $V_{BIAS}-V_{EE}$. T11 and T12 provide an active load current mirror for T13 and T14. The drain-source current ($I_{ds}$) of T12 is equal to the drain-source current of T11. The value of this current is determined by the gate-source ($V_{gs}$) voltage of T11. The $V_{gs}$ of T11 is equal to $V_{CC}-V_{drain}$ of T13. T13 and T14 will have two states: T13 "OFF" and T14 "ON" or T13 "ON" and T14 "OFF". The common drain connection (N1) of T12 and T14 drives the gate of the bypass transistor T3.

If the voltage $V_{REF}$ connected to the gate of T13 is less than $V_{DATA}$ connected to the gate of T14, T13 is "OFF" and T14 is "ON" and N1 will go low such that T3 (the bypass transistor) turns "ON". The mechanism for this is as $V_{DATA}$ increases to be greater than $V_{REF}$ the voltage at N2 becomes $V_{DATA}-V_{gs}$ of T14. The $V_{gs}$ of T14 becomes the value such that $I_{ds}$ of T14=$I_{ds}$ of T15 (bias current) At this point $V_{gs}$ of T13=$V_{REF}-V_{N2}$ is less than the threshold voltage of T13 and T13 turns "OFF". When T13 turns "OFF", $I_{ds}$ of T13="OFF" thus $I_{ds}$ of T11 and T12="OFF". T14 is trying to set its $I_{ds}$ to $I_{BIAS}$ but with T13 "OFF", the $V_{DRAIN}$ of T14 lowers so as to turn "ON" T3.

If the voltage $V_{REF}$ connected to the gate of T13 is greater than $V_{DATA}$ connected to the gate of T14, T13 is "ON" and T14 is "OFF" and N1 will go high such that T3 (the bypass transistor) turns "OFF". The mechanism is now reversed with the voltage at N2 becomes Vref−$V_{gs}$ of T13 where $V_{gs}$ of T13 becomes the value such that $I_{ds}$ of T13=$I_{ds}$ of T15 (bias current). The $I_{ds}$ of T11 and T12=$I_{ds}$ of T13. The $V_{gs}$ of T14 decreases until it is less than the threshold voltage of T14 and T14 turns "OFF". The drain voltage of T14 now rises so as to turn "OFF" T3.

Figure 7:
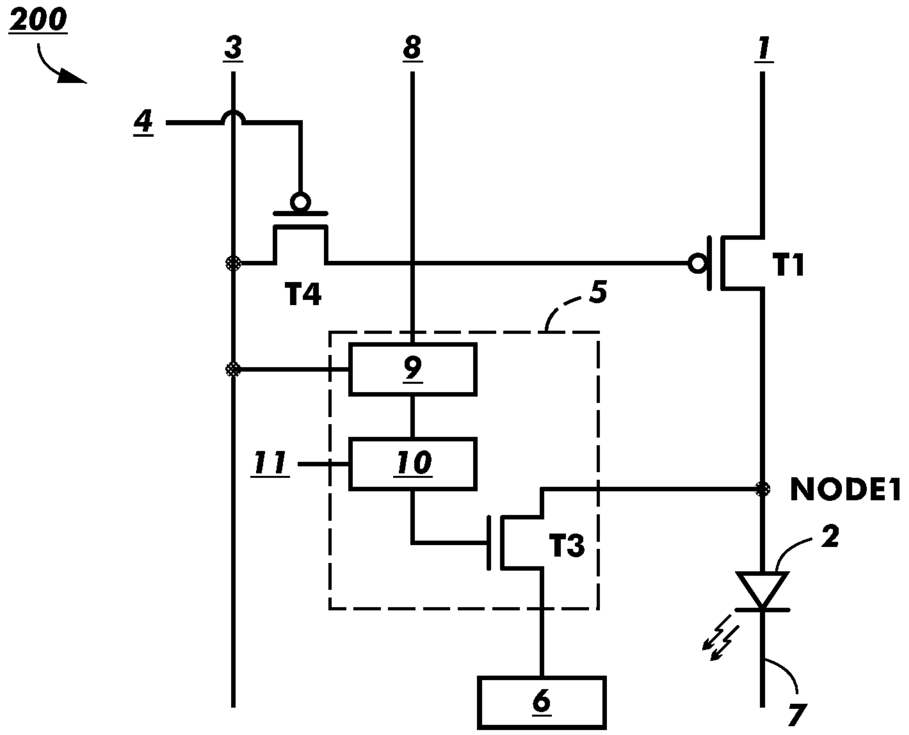
FIG. 7 shows an inventive pixel circuit 200 with a more detailed pixel control circuit.

FIG. 7 shows a basic pixel circuit 200, which is similar to circuit 150 in FIG. 3. Although T1 and T4 are shown as p-channel transistors and T3 as a n-channel transistor in this embodiment, this is not limiting and other arrangement are possible. PCC 5 (within the dashed box) has a latch circuit 10 located between the decision circuit 9 and the gate of the bypass transistor T3. The output signal of the decision circuit 9 (for example, a voltage $V_{OUTPUT}$) is the input to the latch circuit 10 and should be in the form of a "ON" or "OFF" signal that indicates whether the bypass transistor T3 allows or disallows electrical connection between the segmented electrode 2 and sink 6. The purpose of the latch circuit 10 is to lock the control of bypass transistor T3 to the setting as determined by the decision circuit 9 for that pixel for the entire remainder of the frame and prevent any further change to the setting by changes in the data signal when subsequent rows are written. The latch circuit 10 also receives input from a shunt clock 11 that provides the timing of the lock.

The use and operation of latch circuits (also known as flip-flop circuits) are well-known and have been used in OLEDs. For example, see U.S. Pat. No. 8,068,072, US20090295770 and U.S. Ser. No. 10/546,541.

Figure 8:
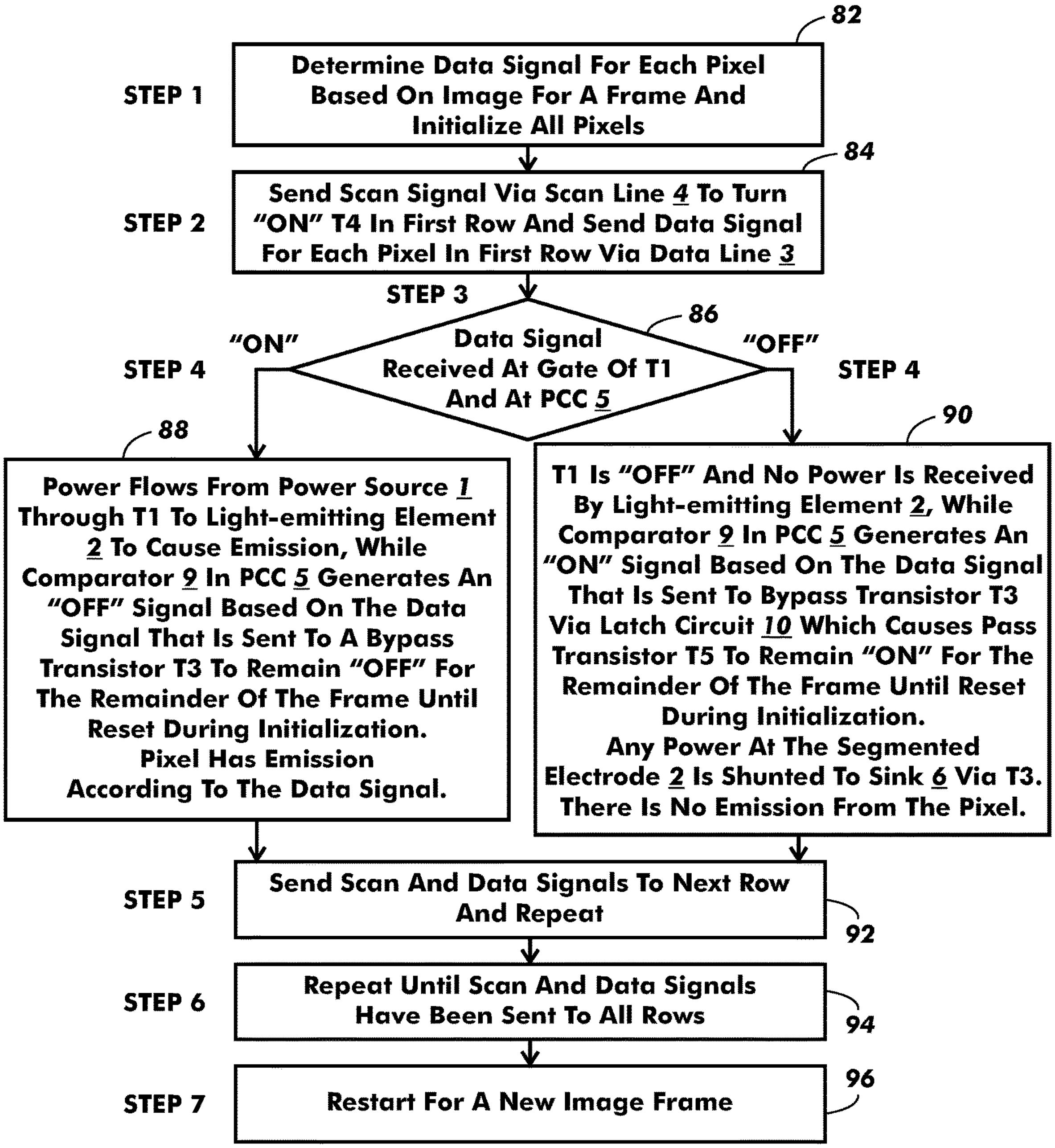
FIG. 8 shows a flowchart for the operation of pixel circuit 200.

The general operational sequence of pixel circuit 200 is shown in the flow diagram shown in FIG. 8. In a first step, the display controller circuitry (which is located outside the display area) determines the appropriate data signal that will generate the desired light emission from each pixel along a row during a single image frame. It will also initialize all pixels in preparation to receive the data according to the image signal. This initialization includes resetting the scan clock and shunt clock which are part of the display controller.

In a second step, the display controller sends a scan signal via scan line 4 that sets scan transistor T4 to be "ON" for the entire $1^{st}$ row of pixels. The scan clock controls the timing of which rows are activated by the scan signal.

In a third step, which is simultaneous with the second step, a data signal is sent through data line 3 for each individual pixel along that $1^{st}$ row. The data signal serves as input to two different portions of the pixel circuit. In the first, the signal data passes through T4 to the gate of the drive transistor T1. The data signal controls the gate of the drive transistor T1 to allow the appropriate amount of power to pass from the power supply 1 to the light-emitting element 2. In the second, the data signal is input to PCC 5 which controls the gate of the bypass transistor T3.

Step 4 depends on the data signal. If the data signal is such that T1 is turned "ON" and so power can flow from power supply 1 to light-emitting element 2, the pixel will emit light. Simultaneously, the decision circuit 9 of the PCC 5 determines whether the data signal is sufficient to cause T1 to be "ON". In the case of pixel circuit 200, this determination is made by comparing the data signal to a reference signal. If the difference between the data signal and the reference signal is such that the determination is that the data signal will cause pixel emission, then a "OFF" signal is sent as output by decision circuit 9 to a latch circuit 10. Latch circuit 10 then passes the output signal to the gate of bypass transistor T3 so that T3 is "OFF" and allows no electrical connection between the segment electrode of 2 and the sink 6. The latch circuit 10 also "locks" the "OFF" signal and maintains it during the entire frame and until reset during the initialization of a new frame. In this way, the presence of the bypass transistor T3 has no effect on the operation of an emitting pixel and the display operates in a normal manner.

However, if the difference between the data signal and the reference signal is such that the determination is that the data signal will not allow pixel emission, then a "ON" signal is sent as output by decision circuit 9 to a latch circuit 10. Latch circuit 10 then "locks" the "ON" signal at the gate of T3 and maintains it during the entire frame and until reset during the initialization of a new frame. In this way, whenever the data signal indicates that the pixel should not be emitting light, the bypass transistor T3 is "ON" and so any power at the segmented electrode of the light-emitting element 2 will be shunted to sink 6 and there will not be any emission from the pixel. In this case, the pixel is protected against emission caused by electrical crosstalk as well as any current leakage through the drive transistor T1.

The timing of the latch circuit 10 is controlled by shunt clock 11 which is part of the display controller and activates the latch circuit 10 during the time during which the data and scan signals are being written for that individual pixel and the determination by PCC 5 is being made. The shunt clock 11 is specific to a row and the latch circuit 10 prevents data written to subsequent rows without impacting data written to previous rows. While the shunt clock 11 can be different from a scan clock which controls the timing of scan sign sent to the gate of T4 to allow that data signal to pass to the gate of T1, it is desirably the same. It can also initiate at the same time as the scan signal and end before the scan signal ends.

It is important that the latch circuit 10 maintains the "ON" or "OFF" signal at T3 for the entire time of the image frame until reinitialized. This is because the data line supplies a data signal for each individual pixel of the column at one time or another. In normal operation, the data signal is not received by pixels in any row not selected by the scan signal because the scan transistor T4 is "OFF". However, in this case, the PCC 5 will receive the data signal for other pixels in different rows, without regard to whether its row has received a scan signal to activate T4. By 'locking' the signal that controls T3 at the time that pixel is being actively received the intended data signal, the data signal for other pixels will not affect whether the bypass transistor is "ON" or "OFF" for that individual pixel.

This is one of the advantages of using a PCC to control a bypass transistor solely on the basis of the value of the data signal without direct involvement of the scan signal. As part of the initialization of Step 1, a data signal signifying that the pixel should be "OFF" can be sent to all pixels at once so that the PCC 5 causes the bypass transistor T3 to be "ON" and so, there is no pixel emission for any reason. Then during steps 2-7, the bypass transistor T3 in each pixel is turned "OFF" or "ON" (as determined by the data signal) as each row is scanned in sequence. This means that any neighboring pixel rows that are not yet activated will have the bypass transistor turned "ON". For example, while the $N^{th}$ row is being activated and the bypass transistor T3 is being turned "ON" or "OFF" according to the data signal whether that pixel should emit or not, the bypass transistor T3 will be "ON" for the entire $(N+1)^{th}$, $(N+2)^{th}$, etc. rows. Since some of the pixels in the Nth row will be emitting, crosstalk can cause potential at the segmented electrodes in neighboring pixels in the $(N+1)^{th}$, $(N+2)^{th}$, etc row, even though they haven't been activated yet. Yet, because the bypass transistor T3 is "ON" in these un-activated rows, they cannot emit. In this way, the effects of crosstalk can be reduced.

Another advantage of using a PCC is that a rolling scan could be used for crosstalk minimization in which an active ("ON") display row was bordered by "OFF" lines. Thus, for rows N, (N+1), (N+2), the pixels in row (N+1) would be turned "ON" while rows N and (N+2) would be turned "OFF". In this way, the effects of crosstalk can also be reduced.

It is also possible that after each pixel in a row that has been scanned and activated, to resend a data signal signifying that all of the pixels along that row should be "OFF". This will require that a second scan signal activate that recently activated row in order to send the "OFF" data signal. For example, a scan signal activates the $N^{th}$ row to receive the appropriate "ON" or "OFF" data signal for the pixels in that row. Then, when the scan signal moves on down the rows and activates the $(N+1)^{th}$ row, a scan signal is resent to the $N^{th}$ row, but with a data signal that indicates that all pixels should be "OFF". However, the timing of these two scan signal must not overlap so that the $N^{th}$ and $(N+1)^{th}$ rows can each receive the correct data signal at the correct time. For example, the timing may be adjusted so that after the $(N+1)^{th}$ row is activated, but before the $(N+2)^{th}$ row is activated, the display controller sends a scan sign to activate the $N^{th}$ row with a data signal that sets the $N^{th}$ row pixels to be "OFF". In this way, even more pixels will be prevented from emitting due to crosstalk.

To be more specific in terms of the operation of the circuit shown in FIG. 7 and described in FIG. 8, one embodiment can be where the driving scheme is analog and the signals and power supplies can be expressed in terms of voltages, and the drive and scan transistors T1 and T4 are p-channel transistors and the bypass transistor T3 is n-channel. It should be noted that for n-channel transistors, a high voltage applied to the gate (i.e., Vg greater than Vs) allows the transistor to be conductive, whereas when low voltages applied to the gate (i.e., Vgs=zero) prevents conductance. The opposite is true for p-channel transistors. In this embodiment, the power supply 1 is a voltage $V_{DD}$, the scan signal is a voltage $V_{SCAN}$, the data signal is voltage $V_{DATA}$, the reference signal 8 is a voltage $V_{REF}$, the output of the decision circuit 9 is a voltage $V_{OUTPUT}$, and the output of the latch circuit 10 is a voltage $V_{LATCH}$. In this case, when $V_{DATA}$ is high, for example, equal to $V_{DD}$, there should be no emission from the pixel. If $V_{DATA}$ is low, for example, equal to zero or negative, then the pixel will emit at its maximum level. When $0<V_{DATA}<V_{DD}$, the emission will be at an intermediate level.

In this embodiment, the circuit operation of the pixel circuit shown in FIG. 7 (see also FIG. 8) can be described as:

Step 1: The shunt clock 11 is set at zero. Initialization involves sending a data signal where $V_{DATA}$ is high so that PCC 5 causes T3 to be "ON" so that the light-emitting element is bypassed.

Steps 2 and 3: A scan signal $V_{SCAN}$ is applied to the gate of T4, which is a p-channel transistor, such that the data signal $V_{DATA}$ is then connected to the gate of the driving transistor T1, which is a p-channel transistor. Simultaneously, $V_{DATA}$ is sent directly from the data line 3 to the decision circuit 9 within the PCC 5.

Step 4: The decision circuit then compares $V_{DATA}$ to $V_{REF}$ to determine if $V_{DATA}$ is greater, the same or less than $V_{REF}$, which in this case is low or zero. If $V_{DATA}$ is greater than $V_{REF}$, which in this embodiment signifies that the pixel should not emit (because a high $V_{DATA}$ will turn T1 "OFF"), then $V_{OUTPUT}$ of the decision circuit 9 is at a high level. If $V_{DATA}$ is less than or the same as $V_{REF}$, which in this embodiment signifies that the pixel should emit (because a low or zero $V_{DATA}$ will turn T1 "ON"), then $V_{OUTPUT}$ will be low or zero.

The latch circuit 10 receives $V_{OUTPUT}$ while the shunt clock 11 changes from zero to a high (non-zero) value. The output of the latch circuit 10, $V_{LATCH}$, is then set to be the same as $V_{OUTPUT}$. The shunt clock 11 then changes from a high value back to zero. This "locks" $V_{LATCH}$ to be the same value as $V_{OUTPUT}$ and no longer changes if $V_{OUTPUT}$ subsequently changes. $V_{LATCH}$ is then applied to the gate of the bypass transistor T3 which is a n-channel transistor. When $V_{LATCH}$ (which is the same as the $V_{OUTPUT}$ when the shunt clock 11 was a high value) is low/zero, then T3 is "OFF" and the pixel emits light normally. When $V_{LATCH}$ is high (non-zero), T3 is "ON" and the pixel will not emit because any current is shunted to the sink 6.

One of the advantages of using a PCC that depends on the signal data to allow the shunting of any voltage and/or current at the segmented electrode of any "OFF" pixel along the entire column will be protected from any crosstalk without regard to whether that pixel is in a selected row or not. Prior art solutions, which depend on the scan signal to shunt voltage and/or current at the segmented electrode, only apply to an activated row. In this way, the total number of possibly "OFF" pixels which have crosstalk protection will be increased and the overall amount of crosstalk will be decreased.

However, not all pixels that could possibly be "OFF" during the frame time will be covered by using the data signal to shunt any voltage and/or current at the segmented electrode to prevent emission. To this end, the use of the data signal to cause shunting can be used together with any of the known methods where the shunting is based on the scan signal. When used in combination, any pixel that is supposed to be "OFF" according to the image will be shunted and no emission will occur.

Figure 9A:
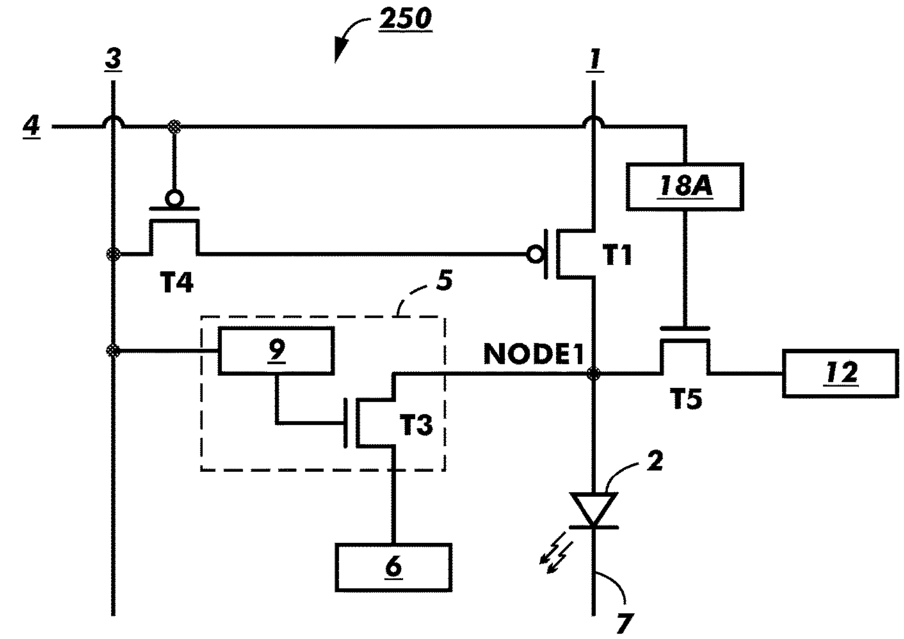
FIG. 9A shows an inventive pixel circuit 250 with a pixel control circuit with the addition of a circuit with a transistor T5 controlled by the scan line.
Figure 9B:
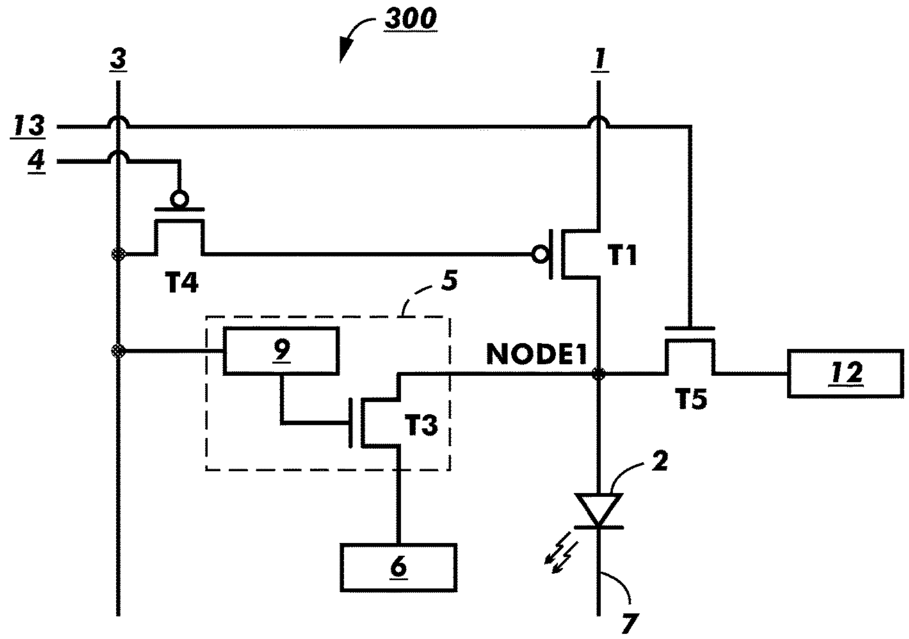
FIG. 9B shows an inventive pixel circuit 300 which is a variant of 250.

An example of this combination is shown in FIGS. 9A and 9B for pixel circuit 250. FIG. 9A is like FIG. 2 except for additional circuitry connecting the scan line 4 to the gate of T5 which is connected to NODE1. In this additional circuitry, the second bypass transistor T5 which will control whether any voltage and/or current at the segmented electrode/NODE1 is shunted to a power source 12, which maintains the voltage below $V_{th}$ of the pixel to prevent emission. The power supply wiring for 12 is preferred to be common to all pixels. Source 12 can also can also be connected to sink 6, directly connected to a ground or have an electrical connection to the opposite electrode of the pixel (typically, $V_{SS}$). However, transistors T4 and T5 cannot be both "ON" at the same time, although both can be "OFF" at the same time. Because both T4 and T5 are controlled by the same signal from scan line 4, it may be necessary to invert the signal so that it turns transistor T5 "ON" so that it connects NODE1 to source 12 whenever T4 is "OFF". There are many methods to invert the scan signal; for example, it can be inverted by optional invertor circuitry 18A or the transistor T5 can be of a different type than the scan transistor T4 (for example, T4 is a p-channel transistor and T5 is a n-channel transistor). It is also possible that the additional circuitry that allows shunting according to the scan signal from scan line 4 be incorporated into PCC 5.

FIG. 9B shows a pixel circuit 300 which is a variant of pixel circuit 250 (FIG. 9A). In pixel circuit 300, the gate of the second bypass transistor T5 is directly controlled by a separate signal line 13. In this embodiment, the signal from signal line 13 may have the same timing as the scan signal from scan line 4, but inverted at the controller level. Alternatively, the signal from scan line 13 may have different timing than the signal from scan line 4.

In any case, the purpose of scan lines 4 or 13 is to control the gate of the second bypass transistor T5 so that it is "OFF" when the pixel is emitting, and "ON" when the pixel is non-emitting, without regard to whether the first bypass transistor T3 is "ON" or "OFF". Most desirably, T5 is "ON" when the pixel is non-emitting and T3 is "OFF".

Figure 9C:
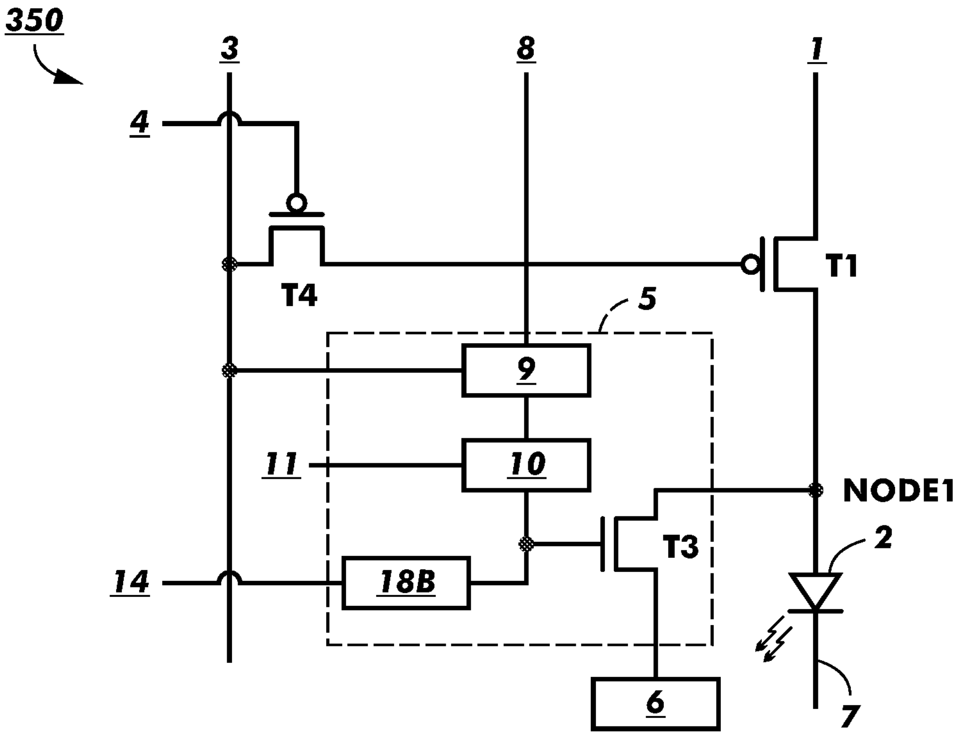
FIG. 9C shows an inventive pixel circuit 350 which is another variant of 250.

FIG. 9C shows another variant 350 of pixel circuits 250 and 300 where the additional circuitry is directly incorporated as part of PCC 5 and uses a single bypass transistor T3 to bypass the light-emitting element 2 when it is non-emitting. In this case, the gate of the bypass transistor T3 can be controlled by either the output of the latch circuit 10 (which depends solely on the data signal) or by a signal from a signal line 14. The signal from signal line 14 can be the same as scan line 4 or may be inverted by an optional invertor circuitry 18B (similar to optional invertor circuitry 18A in 250) if necessary. In these cases, scan line 4 may be used as signal line 14. Alternatively, signal line 14 may be independently controlled and timed by the display controller so that it does not interfere with the control of T3. In this case, it is desirable that whenever the pixel is non-emitting, T3 is turned "ON" by either the latch circuit 10 or from signal line 14, but not both.

FIG. 10A shows a basic pixel circuit 275, which is similar to circuit 150 in FIG. 3. In particular, the decision circuit 9 in PCC 5 (within the dashed box) is connected to the scan line 4 instead of the data line 3. In this embodiment, NODE1 and sink 6 will be in electrical contact (through bypass transistor T3) whenever the scan signal 4 is such that the scan transistor T4 is "OFF" and the drive transistor T1 is not receiving a data signal. In active-matrix devices, an entire row of pixels is activated through the scan transistor of each pixel, which then allows the data signal to be loaded in each pixel through the driving transistor. However, since this process is performed row-by-row in sequence, there are rows for which the data signal to the pixel has not been transmitted yet and so, these pixels should not be emitting. Yet, such yet-to-be activated pixels may be spatially near pixels that are emitting. By allowing an electrical connection between the segmented electrode 109 and sink 6 whenever T4 is "OFF", potential emission in these yet-to-activated pixels due to crosstalk or similar issues may be prevented.

However, this is not entirely sufficient by itself since whenever the scan signal 4 indicates that the scan transistor T4 is "ON" so that the drive transistor T1 is activated according to the data signal 3, some pixels may be "ON" (with at least some emission) and some pixels may be "OFF" (no emission) according to the data signal (based on the image). In order to additionally prevent emission in any "OFF" pixels in activated rows, a bypass line 17, which indicates whether the pixel should be emitting or not, is used.

Bypass line 17 can be a reference source that operates the same as reference source 8 in 150 (FIG. 3), in which case, a separate electrical connection (not shown) between the decision circuit 9 and data line 3 is present. In this case, the decision circuit 9 compares the signal from the data line to the signal from reference source 8 in order to determine if the data signal 3 is sufficient to cause emission. If it is determined that the pixel should be emitting, then the decision circuit 9 sets T3 to be "OFF" to allow the pixel to emit at the intended level. If it is determined that the pixel should not be emitting, then the decision circuit 9 sets T3 to be "ON" to order to prevent unintended emission.

Alternatively, the comparison between the data signal from 3 and a reference signal that is indicative of whether the pixel is intended to emit or not does not have to be made within PCC 5, but in a different part of the circuit. In such cases, the decision circuit 9 can use the signal from bypass line 17 directly.

FIG. 10B shows details for one possible circuit for PCC 5 for 275 (FIG. 10A). In this example of PCC 5, decision circuit 9 comprises a transistor TB which is located in series between the bypass line 17 and the gate of T3. In this particular embodiment, the signal from bypass line 17 already reflects the comparison of the data signal to a reference to determine whether the pixel is intended to emit or not. The mode of operation for this PCC is as follows:

Scan line 4 connected to the gate of T4 is "OFF" and so, T4 is "OFF" and so, provides no data signal to the gate of T1 and so, T1 is "OFF".

Scan line 4 connected to the gate of TB is "OFF" and so, TB is "OFF", and so, provides no data signal to the gate of T3 and so, T3 is "OFF"

Scan line 4 connected to the gate of T4 is "ON" and so, T4 is "ON", and so, provides a data signal from 3 to the gate of T1. T1 is either "ON" or "OFF" depending upon the magnitude of data signal from 3.

Scan line 4 connected to the gate of TB is "ON" and so, TB is "ON" and so, provides a signal from bypass line 17 to the gate of T3.

If the magnitude of the data signal from 3 is such that T1 is "OFF" (no emission), the signal from the bypass line 17 will be such that T3 is "ON" and so, any charge at the segmented electrode of the pixel 2 will be shunted to sink 6 such that pixel 2 emits no light.

If the magnitude of the data signal from 3 is such that T1 is "ON" (some level of light emission), the signal from the bypass line 17 will be such that T3 is "OFF" and so, the pixel 2 will emit light dependent upon the magnitude of data signal from 3.

Figure 11:
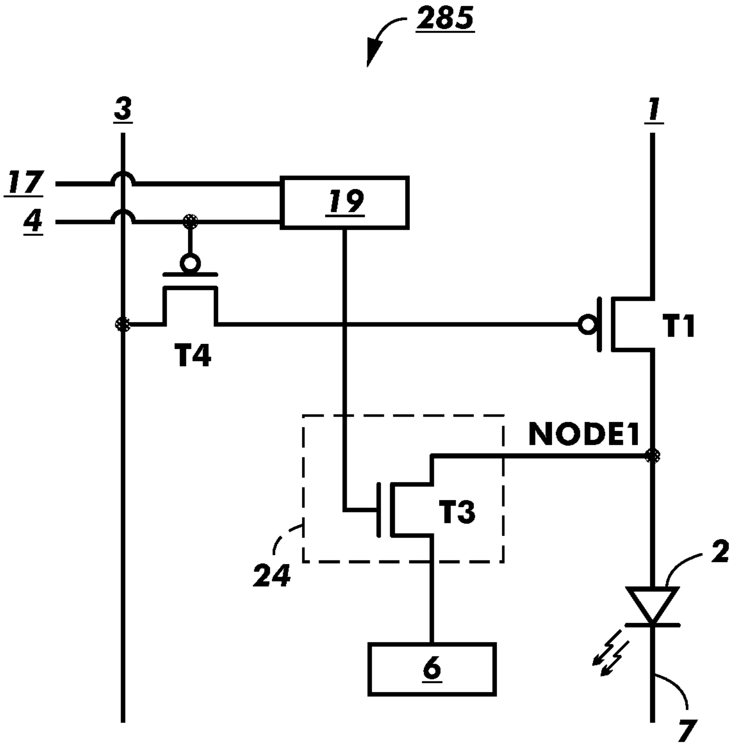
FIG. 11 shows an inventive pixel circuit 285.

In both of the above options, the decision circuit 9 is located within the PCC 5. It controls the operation of T3 based on some combination of the scan signal from 4 together with the data signal from 3. FIG. 11 shows an alternative circuit 285 which is similar to 275 except that the PCC does not contain the decision circuit. Decision circuit 19, which supplies the same functionality as described for decision circuit 9 in 275, is located outside PCC 24. Desirably, decision circuit 19 is part of the image controller, which supplies the appropriate signal to T3.

In both 275 and 285, the decision circuit 9 will output a signal to the gate of T3 that will enable or disable T3 appropriately. If the value of the data signal from 3 is such that that T1 will be "OFF" (drive value=0), either because T1 is not receiving a data signal (T4 is "OFF") or because the received data signal from 3 is for no emission, then the signal from 9 will enable T3. If the value of the data signal from 3 is such that T1 will be "ON", then the signal from 9 will disable T3. It is desirable that each pixel should have a separate and independent bypass line 17 that controls the gate of T3 through a decision circuit.

In 275 and 285, it is desirable that T1 is a P-channel transistor and/or T3 is a P-channel transistor. T1 and T3 may also be N-channel transistors or T1 may be a P-channel and T3 a N-channel.

FIGS. 2, 3, 7, and 9A-9C all illustrate embodiments where the data line 3 directly connects to PCC 5. In other embodiments, the data signal may be received by PCC 5 after the data signal has passed through T4, the scan transistor. The connection to PCC 5 may be between T4 and the gate of T1. With this type of connection, PCC 5 will receive the data signal only for that pixel along the selected row and no other, since T4 will be "OFF" whenever data signals are sent to other pixel rows. While the data signal could be used directly to control the gate of T3, it will only be effective when the value of the data signal is sufficient to turn T3 fully "ON" (if the pixel is "OFF") or "OFF" (when the pixel is "ON") such as when digital driving is used. In other driving methods such as analog driving, the value of the data signal controls the amount of luminance from the pixel and so, intermediate data signal values (value for fully "OFF"/value for pixel/value of fully "ON") are common. Thus, for these types of driving methods, the data signal cannot be used to directly control T3 since T3 may not be fully turned "ON" or "OFF". If the pixel is partially "ON", then T3 will be partially "OFF" and allow some current to be bypass and the pixel will not emit the desired amount of luminance. This is undesirable. In these embodiments, PCC 5 may include a switch that connects the gate of T3 with another power source (for example, voltage $V_{DD}$ of power source 1) with a sufficient level to turn T3 "ON". Such a switch can be based on the value of the data signal. Alternatively, $V_{DATA}$ may be transformed to a higher voltage by including a voltage multiplier circuit or a level shifter circuit. If necessary, a voltage limiter circuit (typically including a Zener diode) may additionally be present.

In some embodiments, the PCC may require a power source. The PCC power source may be the same as power source 1 (i.e., $V_{DD}$) or it may be a separate and independent power source.

The PCC can be activated over the entire frame time. In some cases, depending on the image requirements, it may be activated over multiple sequential frames or for a limited number over a set number of frames. For example, the PCC can be activated for only 5 out of 10 frames, either as a block of 5 frames, followed by 5 frames where it is not activated or 10 frames in an alternating fashion such as on/off for 10 frames or 2 frames on/2 frames off for 10 frames. In some cases, it may be desirable to only activate the PCC over a portion of an individual frame. For example, the PCC can be activated for half the frame and turned off for the remainder of the frame.

While the pixel circuits described above can be used in any kind of display, particularly active-matrix displays, they would be particularly suitable for an active-matrix OLED microdisplay and even more desirably, when the OLED is a high voltage multimodal (white) microcavity OLED. This is because of the combination of the high voltage necessary to operate such OLEDs, the common layers that allow carrier migration from one "on" pixel to another neighboring pixel, which might be "off", thus creating enough voltage in the neighboring "off" pixel to cause emission and because the layers in a microcavity OLED are necessarily thick (in order to create the microcavity) which promotes lateral carrier migration.

Microdisplays require very high luminance in order to be useful under all environmental conditions, such as outdoors in bright sunlight. Even under controlled environment conditions such as in VR googles, very high luminance is needed to create an immersive visual experience. Very high luminance from the display allows the use of lower efficiency optics that are smaller, lighter weight, and less expensive, producing a headset that is more competitive.

Currently, state-of-the-art OLED microdisplays do not provide as much luminance as desired. For example, a press release by one manufacturer of tandem OLED microdisplays describes full color products that may be able to deliver as much as 2.5 k nits, but admits that 5 k nits would be a more desirable goal (see https://www.kopin.com/kopin-to-showcase-latest-advances-in-its-lightning-oled-microdisplay-line-up-at-ces-2020/, dated Jan. 7, 2020). Some manufacturers propose that the goal should be 10 k nits or higher (see https://hdguru.com/calibration-expert-is-10000-nits-of-brightness-enough/, dated Jul. 26, 2018). A recent press release of Jun. 20, 2020 (https://www.businesswire.com/news/home/20200630005205/en/Kopin-Announces-Breakthrough-ColorMax%E2%84%A2-Technology-Unparalleled-Color) describes a tandem (2-stack) OLED display which emits >1000 nits. It also announces that "Further improvements in the brightness (>2000 nits) and color fidelity are expected through optimization of OLED deposition conditions. By incorporating a structure to enhance the output coupling efficiency, the brightness of the OLED microdisplay could be increased to >5000 nits within a couple of years.".

One solution for increasing the total amount of light emitted from OLED devices is to stack multiple OLED units on top of each other, so total light emitted from the stack is the sum of the light emitted by each individual stack. However, while the total light emitted from such OLED stacks is additive based on the total number of individual OLED light-emitting units, the voltage required to drive the OLED stack is additive based on the voltages to drive each independent OLED unit. For example, if a light-emitting OLED unit requires 3 V to produce 250 nits at a given current, then a stack of two such units will require 6V to deliver 500 nits at the same current, a stack of 3 units will require 9V to deliver 750 nits and so forth.

Such OLED stacks are well known; for example, U.S. Pat. Nos. 7,273,663, 9,379,346, 9,741,957; 9,281,487 and US2020/0013978 all describe OLED stacks with multiple stacks of light-emitting OLED units, each separated by intermediate connection layers or charge generation layers. Springer et al, Optics Express, 24 (24), 28131 (2016) reports OLED stacks with 2- and 3-light-emitting units, where each unit has a different color. OLED stacks of up to six light-emitting units have been reported (Spindler et al, "High Brightness OLED Lighting", SID Display Week 2016, San Francisco CA, May 23-27, 2016). In addition, silicon backplanes with low-voltage 5V drive transistors are available that use tandem (two light-emitting OLED units separated by one CGL) OLED stacks for light emission. See, for example, Cho et al, Journal of Information Display, 20(4), 249-255, 2019; https://www.ravepubs.com/oled-silicon-come-new-joint-venture/, published 2018; and Xiao, "Recent Developments in Tandem White Organic Light-Emitting Diodes", Molecules, 24, 151 (2019).

However, this approach, which will require higher driving voltages, is difficult to apply in microdisplay applications. A problem is that the microdisplay also needs to have high resolution, requiring that the size of the individual pixels must be as small as possible and that the active (light-emitting) area of the microdisplay contain as many pixels as possible. This requires that the transistors in the control circuitry of the backplane be small, but yet of sufficient size to handle the required voltages and currents without permanent damage or current leakage. Moreover, using circuits with smaller, low-voltage transistors allows for a higher density of pixels within a given size device. However, while having a high density of individual controlled pixels is desirable for high resolution devices, it increases the problem of crosstalk where powering one pixel can cause light emission from neighboring pixels as well.

Another difficulty with the use of microcavity OLEDs with multiple stacks, which have increased emission, also require higher voltages to operate. The high voltages only promote the generation of carrier migration within a pixel and so, there can be increased migration to neighboring pixels resulting increased crosstalk via unintended emission.

Suitable multimodal microcavity OLED formulations have been described in provisional U.S. Applications 62/966,757 and 63/054,387 as well as non-provisional U.S. application Ser. No. 16/695,191. Any of the formulations, descriptions or embodiments described in these references may be applied to this invention. A suitable multimodal microcavity OLED microdisplay 400 is illustrated in FIG. 12.

Figure 12:
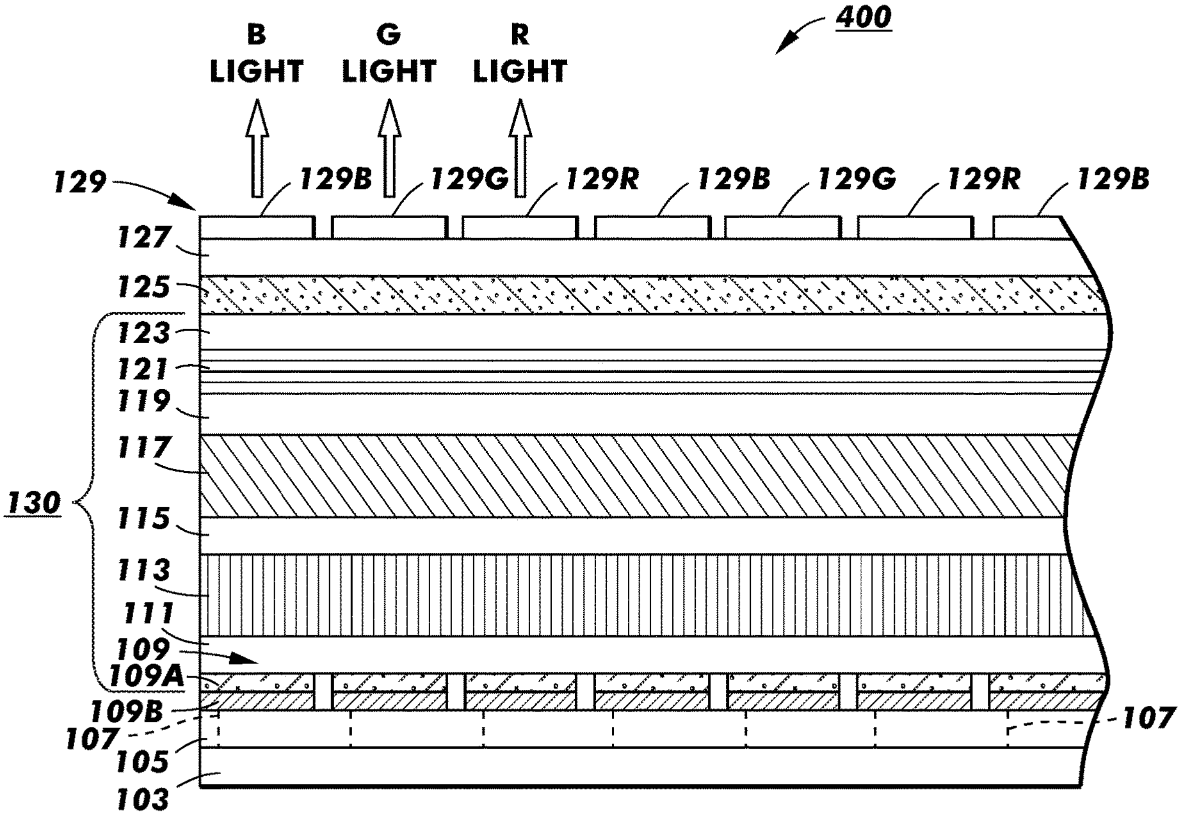
FIG. 12 shows the cross-section of an OLED microdisplay 400 where the OLED is a multimodal microcavity.

FIG. 12 illustrates a microdisplay 400 that uses a multimodal (white) OLED microcavity that is common across all pixels together with a color filter array (CFA) to create R, G, and B pixels. A multimodal OLED produces more than one color of light. Ideally, a multimodal OLED produces a white light with roughly equal amounts of R, G and B light. Typically, this would correspond to $CIE_x$, $CIE_y$ values of approximately 0.33, 0.33. However, some variation from these values is still acceptable or even desirable depending on the characteristics of the color filters used to create RGB pixels. Microdisplay 400 also incorporates the microcavity effect. In this embodiment, the multimodal OLED stack contains three OLED light-emitting units that emit different colors in which each unit is vertically separated from another unit by a CGL where the distance between a reflective surface and the top electrode is constant over the active area.

In microdisplay 400, there is a silicon backplane 103 which comprises an array of control circuits such as shown in FIG. 2 as well as necessary components that will supply power to the subpixels according to an input signal. Over the layer 103 with the transistors and control circuitry, there can be an optional planarization layer 105. Over layer 105 (if present), are individual first electrode segments 109 which are connected by electrical contacts 107, which extend through the optional planarization layer to make electrical contact between the individual bottom electrode segments 109 and the control circuitry in layer 103. In this embodiment, the bottom electrode segments 109 have two layers, a reflective layer 109B which is closer to the substrate, and an electrode layer 109A which is closer to the OLED layers. The individual bottom electrode segments 109 are electrically isolated from each other laterally. Over the segmented bottom electrode segments 109 are non-light-emitting OLED layers 111, such as electron- or hole-injection or electron- or hole-transport layers. A red OLED light-generating unit 113 is over OLED layers 111. Layer 115 is a first charge-generation layer which lies between and separates the red OLED light-generating unit 113 and a green OLED light-generating unit 117. Over the green light-generating unit 117, there is a second charge-generation layer 119 that lies between and separates the green OLED light-generating unit 117 and a blue OLED light-generating unit 121. Over the blue OLED light-generating unit 121 are non-light-emitting OLED layers 123, such as electron- or hole-transport layers or electron- or hole-injection layers, and semi-transparent top electrode (opposite electrode) 125. This forms an OLED microcavity 130 that extends from the uppermost surface of reflective surface 109B to the bottommost surface of the semi-transparent top electrode 125, which is also a semi-reflective electrode. The OLED microcavity is protected from the environment by an encapsulation layer 127. In this embodiment, there is a color filter array with color filters 129B, 129G and 129R which filter the multimodal emission generated by the OLED microcavity 130 so that B, G and R light is emitted according to the power supplied to the underlaying electrode segment It is also important for the control circuitry in OLED microdisplays, which are sample-and-hold type displays, to address the problem of motion blur (see https://www.blurbusters.com/faq/oled-motion-blur/; "Why Do Some OLEDs Have Motion Blur?", dated Dec. 28, 2018 and https://www.soundandvision.com/content/motion-resolution-issue-oled-tvs, "Is Motion Resolution an Issue with OLED TVs", dated Jan. 15, 2015).

The only way to reduce motion blur caused by sample-and-hold, is to shorten the amount of time a frame is displayed. This can be accomplished by using extra refreshes (higher Hz) or via black periods between refreshes (flicker). For OLED microdisplays, the best solution is to "shutter" the display image, either by turning off the entire active area at the same time or by a "rolling" technique, where only part of the displayed image is turned off at one time in a sequential manner. The "rolling" technique is preferred. The time that the pixels are turned off is very short and well below the threshold of detectability by the human eye in order to avoid perceivable flicker. This is accomplished in the control circuitry by the inclusion of a shuttering transistor, which when activated through a select line, prevents current from flowing through the OLED and turns the emission by the OLED pixel "OFF" for the desired period of time. In other words, the shuttering transistor is a switch transistor, in that it only turns the pixel "ON" or "OFF" and does not regulate the voltage or current. However, this solution, where the pixels are turned off for part of the time that an image is displayed (generally referred to as the frame time), only increases the need for increased luminance by the OLED whenever it is "ON" since it is the average luminance over the frame that is perceived by the eye. The shuttering to reduce motion blur can be applied to any method of supplying power to the OLED stack; for example, current control or PWM.

For this reason, microdisplays typically have at least two transistors in series between a power source and the light-emitting engine. The first (driving) transistor, delivers the desired power (voltage and/or current) to the light-emitting engine, and is controlled by a scan line which turns that transistor "on" or "off". The second (switching) transistor controls the duration that the light-emitting engine is "off" to control the motion blur problem. Desirably, both transistors are low voltage (5V or less). Preferably, both transistors are p-channel transistors. Circuits with two or more transistors in the path between the power source and light-emitting element are sometimes referred to has having 'stacked' transistors.

Suitable backplanes for OLED microdisplays are well known. See, for example, Ali et al, "Recent advances in small molecule OLED-on-Silicon microdisplays", Proc. of SPIE Vol. 7415 74150Q-1, 2006; Ying, W., "Silicon Backplane Design for OLED-on-Silicon Microdisplay", MsE Thesis, Nanying Technological University, 2011; Jang et al, J. Information Display, 20(1), 1-8 (2019); Fujii et al, "4032ppi High-Resolution OLED Microdisplay", SID 2018 DIGEST, p. 613; US2019/0259337; Prache, Displays, 22(2), 49 (2001); and Vogel et al, 2018 48$^{th}$ European Solid-State Device Research Conference, p. 90, September 2018.

Some suitable pixel circuit designs for OLED microdisplays can be found in Zeng et al, "A Novel Pixel Circuit with Threshold Voltage Variation Compensation in Three-Dimensional AMOLED on Silicon Microdisplays", P-27, SID 2019 Digest, p. 1313; U.S. Pat. No. 9,066,379; Kimura et al, "New Pixel Driving Circuit Using Self-Discharging Compensation Method for High-Resolution OLED Microdisplays on a Silicon Backplane", 28-3, SID 2017 Digest, p. 399; Dawson et al, "The Impact of the Transient Response of Organic Light Emitting Diodes on the Design of Active Matrix OLED Displays", International Electronic Devices Mtg 1998, 875-878; Kwak et al, "Organic Light-Emitting Diode-on-Silicon Pixel Circuit Using the Source Follower Structure with Active Load for Microdisplays", Japanese Journal of Applied Physics, 50, 03CC05 (2011); Vogel et al, SID 2017 DIGEST, Article 77-1, pp 1125-1128; Liu et al., J. Cent. South Univ., 19, 1276-1282 (2012); Hong et al., SID 2019 DIGEST, Article 9-4, 105 (2019); and Fan et al., International Journal of Photoenergy, Article ID 543273 (2011). In general, all of these references describe pixel circuits that use a driving transistor and a switch transistor in series to deliver power to the anode of the OLED. They also describe the use of p-channel transistors and in some cases, the use of protection circuits to prevent overvoltage. None of these references deal with the problem of crosstalk.

Figure 13:
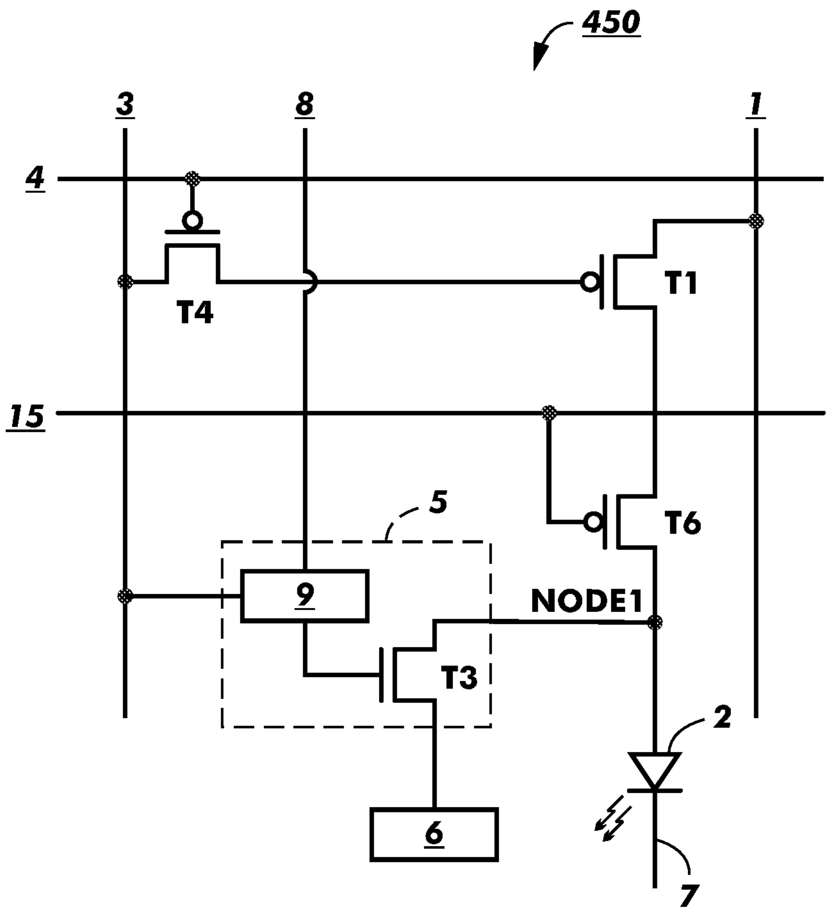
FIG. 13 shows an inventive pixel circuit 450 that is suitable for microdisplays.

FIG. 13 shows a pixel circuit 450 that would be suitable for an OLED microdisplay where the OLED is a multimodal microcavity OLED such as that shown in FIG. 10. It is similar to pixel circuit 150 as shown in FIG. 3 except that it contains an extra switching transistor T6 whose source is connected to the drain of the drive transistor T1 and whose drain is connected to the light-emitting element 2. Thus, T1 and T6 are located in series between the power source 1 and the light-emitting element 2. The gate of T6 is connected to a scan line 15 that is different than scan line 4. The addition of switch transistor T6/scan line 15 provides the shuttering function to minimize motion blur. Thus, switch transistor T6, as controlled by scan line 15, can turn off the light-emitting element 2 for periods of time during the frame.

The embodiment shown in FIG. 13 shows the preferred located of NODE1, which is between one of the source or drain of the switch transistor T6 and the light-emitting element 2. However, in other embodiments, it could also be located between T1 and T6, that is, between the source or drain of T1 and the source or drain of T6. Some pixel circuit designs include more than two transistors in series in the driving part of the circuit between the power source and the light-emitting element; in such cases, the desirable location for NODE1 is between the last transistor in the series and the light-emitting element.

In pixel circuit 450, it is desirable that T1 and T6 are both low voltage (nominally 5V or less) p-channel transistors. It is also desirable that T1 and T6 are located in floating n-wells, where the well voltage is controlled. For example, U.S. Pat. No. 5,764,077 describes a low voltage output buffer using a floating n-well for the low voltage transistors to protect the circuit from overvoltage conditions. Also, the use of floating n-wells is described in U.S. Pat. Nos. 9,066,379 and 7,768,299. In some cases, any of the transistors in the entire pixel circuit can be in located in their own separate n-wells. For example, see Shimazaki et al, "A Shared-Well Dual-Supply-Voltage 64-bit ALU", IEEE J. of Solid-State Circuits, 39(3), 494 (2004).

It is also desirable to include additional circuitry (not shown) to pixel circuit 450 that protects both the drive and switch transistors against damages from transient excessive voltages. For example, see Kwak et al, U.S. Pat. No. 9,066,379, and Vogel et al, Proc. SPIE 10335, Digital Optical Technologies, 1022502 (2017). Such additional overvoltage protection methods may be incorporated into the PCC.

It is well known to add various types of compensation circuits (with associated gate lines, reference voltage and supply voltages, etc.) to correct for pixel-to-pixel variations in Vth, leakage current, aging effects and other problems leading to non-uniformity. Such additional compensation methods may be incorporated as part of the PCC.

The inventive circuit described above can also be in any transistor-controlled device that operates a load where it is necessary to reduce the voltage or current delivered to the load as a function of either the amount of power delivered to the controlling transistor and/or whether the controlling transistor is switched "ON" or "OFF" by a separate control line.

While crosstalk can be a particular concern with microdisplays, it can also be a serious problem with larger sized display devices such as mobile phones and televisions since they also require high resolution. The pixel circuit described above is suitable for use for reducing crosstalk in any size display device.

Active-matrix displays can be driven with constant luminance over a full frame cycle (often referred to analog programming). A pixel is typically programmed once each single frame period and the data is held constant by a storage capacitor until the next frame cycle when the pixel data is refreshed. In most active-matrix devices, during a frame, each pixel along a column will receive a data signal. Each row in sequence will receive a scan signal that allows the data signal to pass to the pixel driving circuit in each pixel along that row. The data signal can be stored in a capacitor which is part of the pixel circuit (see FIG. 1). This data signal causes the pixels along the selected row to emit fully, partially or not at all; each according to the data signal. It should be noted that the data signal supplied to the individual pixels along each column are specific to that pixel and determines the desired luminance of that pixel; thus, the data signal varies depending on which row is selected. The scan signal is constant and is the same for each pixel along that row.

Active-matrix displays can also be digitally driven. This method involves of expressing the total luminance provided by a pixel by dividing a single image frame into a plurality of subframes and setting the emission periods for the respective sub-frames to be different. In this driving method, the scan signal is supplied by the scan lines and so, according to the scan signal, the pixels along each row receive the data signal from the data lines. Since the total emission of the pixel in this driving method is according to the time and not the level of the data signal, only two levels of data signal are required. A first data signal allows the pixels to emit light fully, and the second data signal causes the pixels not to emit light.

It should be noted that the pixel circuit can be the same for both the analog and digital methods, as well as any methods of driving based on current, of driving the light-emitting element and all can be used to drive the pixel circuit shown in FIG. 2 and other inventive devices herein.

The display with the inventive pixel circuit can be full color, bichromatic or monochromatic.

It is well known to those skilled in the art to adjust signal types and levels to be appropriate for the types of circuitries used. In particular, transistors such as n-channel and p-channel transistors fundamentally behave differently and need different signals to work as intended. Examples in this description may describe particular signals in reference to particular transistors, but these should not be considered as limiting. Examples have been described in terms of the performance desired to achieve the desired benefits; modifications that result in the same benefit are well within the skill of the art.

In the above description, reference is made to the accompanying drawings that form a part hereof, and in which are shown by way of illustration specific embodiments which may be practiced. These embodiments are described in detail to enable those skilled in the art to practice the invention, and it is to be understood that other embodiments may be utilized and that structural, logical and electrical changes may be made without departing from the scope of the present invention. The description of any example embodiments is, therefore, not to be taken in a limiting sense. Although the present invention has been described for the purpose of illustration, it is understood that such detail is solely for that purpose and variations can be made by those skilled in the art without departing from the spirit and scope of the invention.

| Parts List | |
|---|---|
| $V_{DD}$, 1, 12 | Power source |
| MP1, T4 | Scan (select) transistor |
| MP2, T1 | Driving transistor |
| C1 | Storage capacitor |
| T3 | Bypass transistor |
| T5 | Second bypass transistor |
| T6 | Switching Transistor |
| T11, T12, T13, T14, T15 | Transistors in comparator circuits |
| TB | Transistor in decision circuit |
| 2 | Light-emitting element/pixel |
| 3 | Data line |
| 4 | Select (scan) line |
| 5, 24 | PCC (pixel control circuit) |
| 6 | Sink |
| 7 | Second power source |
| NODE1, N1, N2 | Electrical Connection |
| 8 | Optional reference source |
| 9, 19 | Decision circuit/subunit |
| 10 | Latch circuit/subunit |
| 11 | Shunt clock |
| 13, 14, 15 | Signal (scan) lines |
| 17 | Bypass line |
| 18A, 18B | Optional invertor circuitry |
| $V_{CC}$, $V_{EE}$ | External operating voltage sources |
| $V_{DATA}$ | Data signal Voltage |
| $V_{REF}$ | Reference Voltage |
| $V_{SCAN}$ | Scan (select) signal Voltage |
| R1, R2, R3, R4 | Resistors |
| Q1, Q2, Q4 | Bipolar junction transistors |
| 20, 21, 22 | Comparator circuits of the decision circuit |
| Z1 | Zener diode |
| 82 | Step 1 |
| 84 | Step 2 |
| 86 | Step 3 |
| 88 | Step 4 (if "ON") |
| 90 | Step 4 (if "OFF") |
| 92 | Step 5 |
| 94 | Step 6 |
| 96 | Step 7 |
| 100, 150, 200, 250, 275, 285, 300, 350, 450 | Pixel Circuits |
| 400 | Microdisplay |
| 103 | Silicon Backplane |
| 105 | Optional planarization layer |
| 107 | Electrical contacts |
| 109 | Segmented electrode |
| 109A | Conductive electrode layer |
| 109B | Reflective layer |
| 111 | OLED layers |
| 113 | Red light-emitting unit |
| 115 | First charge generating layer (CGL) |
| 117 | Green light-emitting unit |
| 119 | Second charge generating layer (CGL) |
| 121 | Blue light-generating layer |
| 123 | OLED layers |
| 125 | Top electrode |
| 129B, 129G, 129R | Color filters |
| 130 | Microcavity |

The invention claimed is:

1. An active-matrix display comprising:

a power source $V_{DD}$;

a pixel array of columns and rows, each light-emitting pixel having an individually controlled segmented electrode and an opposite electrode;

a driving circuit comprising at least one data line that supplies a data signal ($V_{DATA}$) for each pixel along a column, wherein the data signal ($V_{DATA}$) controls the gate of a driving transistor (T1) whose source and drain are connected between the power source $V_{DD}$ and the segmented electrode and at least one scan line that supplies a scan signal ($V_{SCAN}$) that controls the gate of a scan transistor (T4) that enables the loading of the data signal ($V_{DATA}$) from the data line to the gate of the driving transistor (T1) for each pixel along a row; and a pixel control circuit in electrical contact with the segmented electrode wherein the pixel control circuit, based on the value of the data signal ($V_{DATA}$) for that pixel, is not involved in the driving of the pixel when the pixel is supposed to be emitting above some minimum amount;

wherein the pixel control circuit is attached to a node (NODE1) located along the electrical line between the driving transistor (T1) and the segmented electrode and prevents light emission by having a bypass transistor (T3) that allows electrical connection between the segmented electrode and a sink, which drains the voltage and/or current to a level below that needed for light emission, whenever the data signal ($V_{DATA}$) indicates that the pixel should be non-emitting or have emission below a threshold; and where the pixel control circuit comprises:

a decision subunit that compares the data signal voltage $V_{DATA}$ to a reference voltage $V_{REF}$ and based on that comparison, provides an output voltage $V_{OUTPUT}$; and a latch subunit that receives the output voltage $V_{OUTPUT}$ from the decision subunit and controls the bypass transistor (T3) so that either the electrical connection between the segmented electrode and the sink is allowed or disallowed based on $V_{OUTPUT}$.

2. The display of claim 1 wherein the pixel control circuit is disabled when the value of the data signal ($V_{DATA}$) for that pixel indicates emission above a threshold.

3. The display of claim 2 wherein whenever the scan signal ($V_{SCAN}$) indicates that the scan transistor (T4) should prevent the loading of the data signal ($V_{DATA}$) to the gate of the driving transistor (T1) and $V_{OUTPUT}$ was set to disable the bypass transistor (T3), then the bypass transistor (T3) allows electrical connection between the segmented electrode and a sink, which drains the voltage and/or current to a level below that needed for light emission; and where the pixel control circuit comprises:

a transistor (TB) whose gate is controlled by a scan signal $V_{SCAN}$ and is connected in series between the decision subunit and the gate of the bypass transistor (T3);

so that whenever $V_{SCAN}$ is such that the transistor (TB) is enabled so that $V_{OUTPUT}$ is applied to the gate of the bypass transistor (T3), electrical connection between the segmented electrode and a sink is allowed or disallowed based on the value of $V_{OUTPUT}$.

4. The display of claim 1 wherein whenever the scan signal ($V_{SCAN}$) indicates that the scan transistor (T4) should prevent the loading of the data signal ($V_{DATA}$) to the gate of the driving transistor (T1) and $V_{OUTPUT}$ was set to disable the bypass transistor (T3), then the bypass transistor (T3) allows electrical connection between the segmented electrode and a sink, which drains the voltage and/or current to a level below that needed for light emission.

5. The display of claim 4 where the pixel control circuit further comprises:

a transistor (TB) whose gate is controlled by a scan signal $V_{SCAN}$ and is connected in series between the decision subunit and the gate of the bypass transistor (T3);

so that whenever $V_{SCAN}$ is such that the transistor (TB) is enabled so that $V_{OUTPUT}$ is applied to the gate of the bypass transistor (T3), electrical connection between the segmented electrode and a sink is allowed or disallowed based on the value of $V_{OUTPUT}$.

6. The display of claim 5 where $V_{REF}$ and the voltage of the power source $V_{DD}$ are the same.

7. The display of claim 1 where $V_{REF}$ and the voltage of the power source $V_{DD}$ are the same.

8. The display of claim 1 which is an OLED microdisplay.

9. The display of claim 8 where the light-emitting pixels are formed using a multimodal microcavity OLED with a color filter array.

10. The display of claim 9 where the multimodal microcavity OLED has three or more stacks of light-emitting units.

11. The display of claim 10 which has a threshold voltage $V_{th}$ of 5V or greater.

12. The display of claim 1 where there is a switching transistor (T6) connected in series between the driving transistor (T1) and the segmented electrode so that the driving transistor (T1) and switching transistor (T6) are in series between the power source and the segmented electrode.

13. The display of claim 12 where the driving transistor (T1) and switching transistors (T6) are both p-channel transistors and the bypass transistor (T3) is a n-channel transistor.

* * * * *